United States Patent [19]

Takeda

[11] Patent Number: 5,734,808
[45] Date of Patent: Mar. 31, 1998

[54] PIPELINE PROCESSING DEVICE, CLIPPING PROCESSING DEVICE, THREE-DIMENSIONAL SIMULATOR DEVICE AND PIPELINE PROCESSING METHOD

[75] Inventor: Masaki Takeda, Tokyo, Japan

[73] Assignee: Namco Ltd., Tokyo, Japan

[21] Appl. No.: 436,425

[22] PCT Filed: Sep. 28, 1994

[86] PCT No.: PCT/JP94/01596

§ 371 Date: May 24, 1995

§ 102(e) Date: May 24, 1995

[87] PCT Pub. No.: WO95/09390

PCT Pub. Date: Apr. 6, 1995

[30] Foreign Application Priority Data

Sep. 28, 1993 [JP] Japan ................................ 5-264410

[51] Int. Cl.⁶ .................................................. G06F 17/00
[52] U.S. Cl. ...................................... 395/134; 395/513
[58] Field of Search .................................. 395/134, 513

[56] References Cited

U.S. PATENT DOCUMENTS 4,449,201  5/1984  Clark ................................. 395/134
4,945,500  7/1990  Deering ............................ 364/522
5,208,909  5/1993  Corona ............................. 395/155
5,297,240  3/1994  Priem ............................... 395/134
5,420,980  5/1995  Pineda .............................. 395/164

FOREIGN PATENT DOCUMENTS

A-63-16388   1/1988  Japan.
A-2-81185    3/1990  Japan.
A-4-75143    3/1992  Japan.
A-4-152432   5/1992  Japan.

*Primary Examiner*—Eric Coleman
*Attorney, Agent, or Firm*—Oliff & Berridge, PLC

[57] ABSTRACT

An objective of this invention is to provide a pipeline processing device that enables the implementation of optimized pipeline processing and moreover has a simple configuration and control method, and a clipping processing device that uses this pipeline processing device. Data is sequentially transferred to pipeline register sections (500 to 506), but only when there is processing data in each previous stage, and given data processing is performed in data processing sections (520 to 524). After the end of input of processing data in which a plurality of data items is formed into one string D[0:3], this data is automatically extracted from the pipeline register sections (500 to 506). These transfer and automatic extraction operations in the pipeline control sections (530 to 536) are controlled by an LD signal. This LD signal is formed by ENIN and FLASHIN signals.

8 Claims, 21 Drawing Sheets

FIG. 4

| TIME | ENIN | FLASH IN | DATA IN PIPELINE REGISTERS | | | | | |
|---|---|---|---|---|---|---|---|---|
| | | | FIRST STAGE | SECOND STAGE | THIRD STAGE | FOURTH STAGE | | N-TH STAGE |
| 0 | 0 | 0 | - | - | - | - | ... | - |
| 1 | 1 | 0 | - | - | - | - | ... | - |
| 2 | 0 | 0 | A1 | - | - | - | ... | - |
| 3 | 1 | 0 | A1 | - | - | - | ... | - |
| 4 | 1 | 0 | A2 | A1 | - | - | ... | - |
| 5 | 0 | 0 | A3 | A2 | A1 | - | ... | - |
| 6 | 0 | 1 | A3 | A2 | A1 | - | ... | - |
| 7 | 0 | 0 | - | A3 | A2 | A1 | ... | - |
| 8 | 0 | 0 | - | - | A3 | A2 | ... | - |
| 9 | 0 | 0 | - | - | - | A3 | ... | - |
| ... | 0 | 0 | ... | ... | ... | ... | ... | ... |
| N+3 | 0 | 0 | - | - | - | - | ... | A1 |
| N+4 | 0 | 0 | - | - | - | - | ... | A2 |
| N+5 | 0 | 0 | - | - | - | - | ... | A3 |
| N+6 | 0 | 0 | - | - | - | - | ... | - |

FIG. 5

| TIME | ENIN | FLASH IN | DATA IN PIPELINE REGISTERS | | | | | |
|---|---|---|---|---|---|---|---|---|
| | | | FIRST STAGE | SECOND STAGE | THIRD STAGE | FOURTH STAGE | | N-TH STAGE |
| 0 | 0 | 0 | − | − | − | − | ... | − |
| 1 | 1 | 0 | − | − | − | − | ... | − |
| 2 | 0 | 0 | A1 | − | − | − | ... | − |
| 3 | 1 | 0 | A1 | − | − | − | ... | − |
| 4 | 1 | 0 | A2 | A1 | − | − | ... | − |
| 5 | 0 | 0 | A3 | A2 | A1 | − | ... | − |
| 6 | 1 | 1 | A3 | A2 | A1 | − | ... | − |
| 7 | 0 | 0 | B1 | A3 | A2 | A1 | ... | − |
| 8 | 1 | 0 | B1 | − | A3 | A2 | ... | − |
| 9 | 0 | 0 | B2 | B1 | − | A3 | ... | − |
| ... | 0 | 0 | ... | ... | ... | ... | ... | ... |
| N+3 | 0 | 0 | B2 | B1 | − | − | ... | A1 |
| N+4 | 1 | 0 | B2 | B1 | − | − | ... | A2 |
| N+5 | 1 | 0 | B3 | B2 | B1 | − | ... | A3 |
| N+6 | 0 | 0 | B4 | B3 | B2 | B1 | ... | − |
| N+7 | 0 | 1 | B4 | B3 | B2 | B1 | ... | − |
| N+8 | 1 | 0 | − | B4 | B3 | B2 | ... | − |
| N+9 | 1 | 0 | C1 | − | B4 | B3 | ... | − |
| N+10 | 0 | 0 | C2 | C1 | − | B4 | ... | − |
| N+11 | 0 | 0 | C2 | C1 | − | − | ... | − |
| ... | 0 | 0 | ... | ... | ... | ... | ... | ... |
| 2N+6 | 0 | 0 | C2 | C1 | − | − | ... | B4 |
| 2N+7 | 0 | 0 | C2 | C1 | − | − | ... | − |

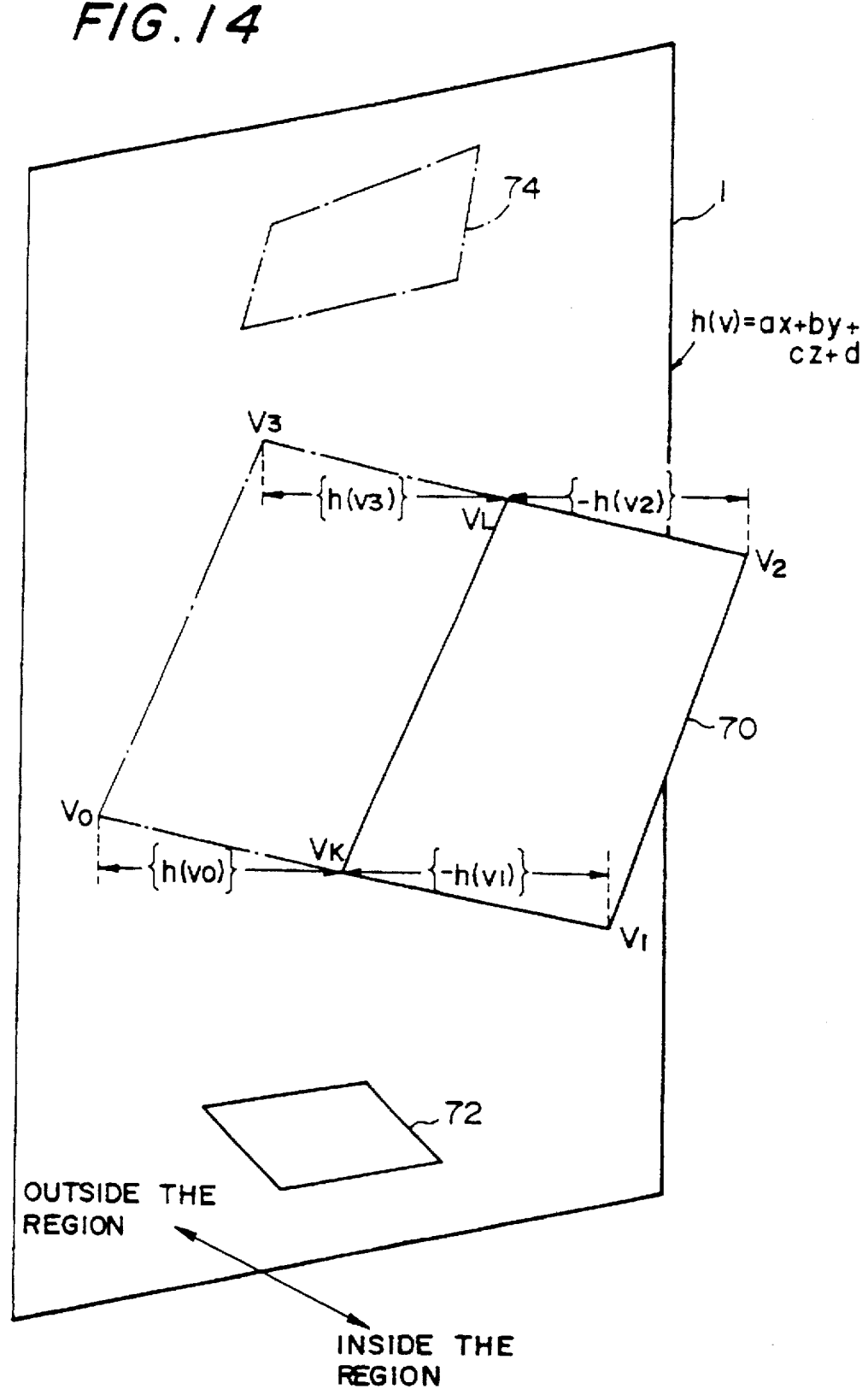

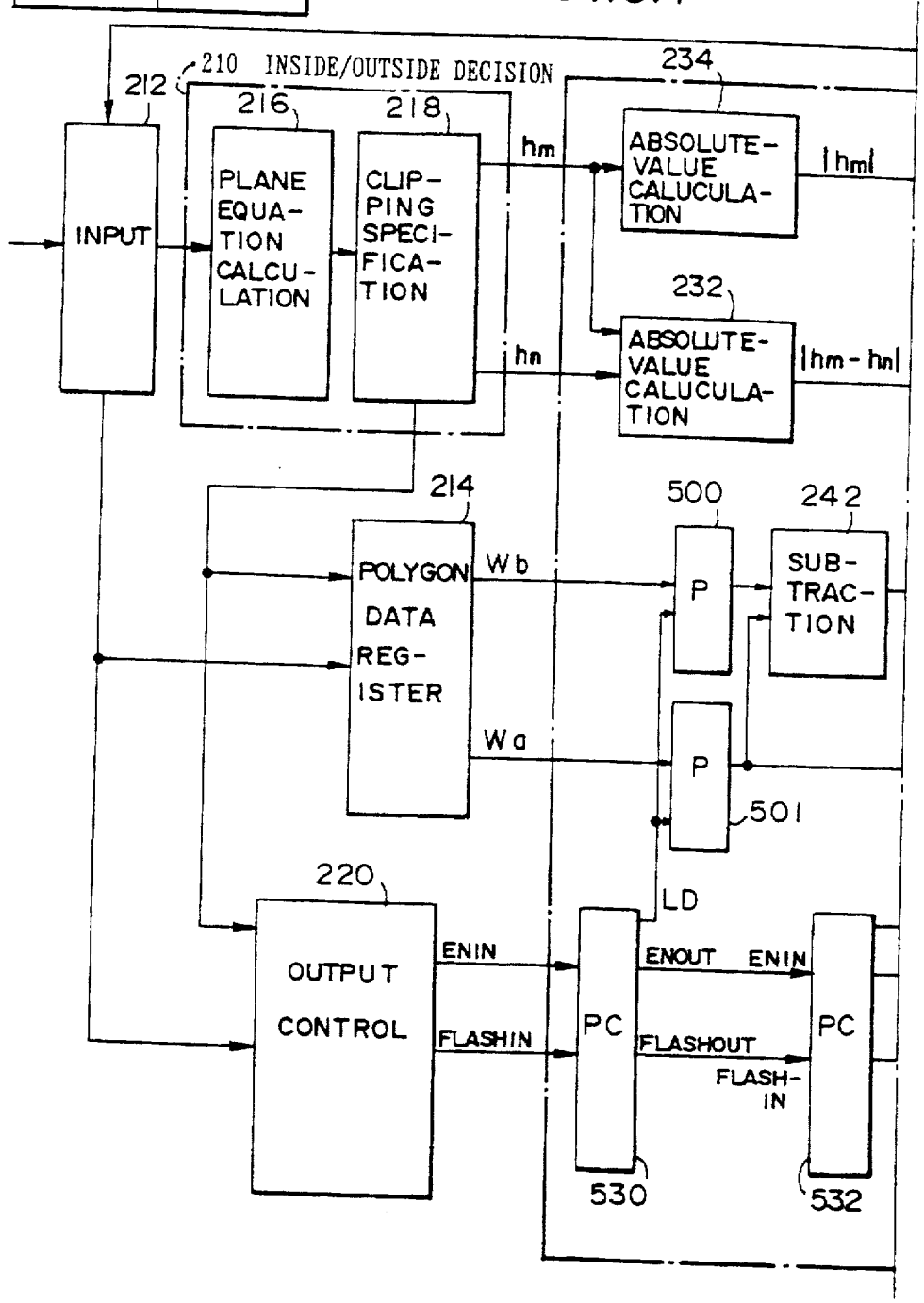

PIPELINE PROCESSING DEVICE, CLIPPING PROCESSING DEVICE, THREE-DIMENSIONAL SIMULATOR DEVICE AND PIPELINE PROCESSING METHOD

TECHNICAL FIELD

This invention relates to a pipeline processing device as well as to a clipping processing device, a three-dimensional (3D) simulator device, and a pipeline processing method using such a pipeline processing device.

BACKGROUND OF ART

In the prior art, since real-time processing must be performed by a 3D simulator device, such as a 3D simulator device used in a video game or piloting simulator for an aircraft or any of various other types of vehicle that displays pseudo-3D images, data processing is generally performed by a method called pipeline processing.

In this case, pipeline processing is a data processing method in which function-specific hardware is connected in series and the processing load is equalized between these components.

Processing devices using two methods, clock-driven pipeline processing and data-driven pipeline processing, are known as prior-art pipeline processing devices as shown in FIGS. 20A and 20B.

With the clock-driven pipeline processing device shown in FIG. 20A, registers 450 to 453 driven by a common clock signal are connected in series, and data processing is performed thereby in data processing sections 455 to 458. This clock-driven pipeline processing device has the advantage that, since the entire flow of the data to be processed is synchronized by this common clock signal and is at the same timing, the control method is extremely simple.

With the data-driven pipeline processing device shown in FIG. 20B, registers 460 to 463 that are driven only if there is processing data in the previous stage are connected in series, and data processing is performed thereby in data processing sections 465 to 468. In this data-driven pipeline processing device, each of the registers 460 to 463 is driven only if there is processing data in the previous stage. Therefore, there must be processing data in all of the registers during the execution of pipeline processing. As a result, equalization of the load of data processing, which is an objective of pipeline processing, can be implemented even more efficiently.

However, both the above described clock-driven pipeline processing device and data-driven pipeline processing device have problems, as described below.

With the clock-driven pipeline processing device, a common clock signal is supplied to all of the registers 450 to 453 and the processing data is transferred thereby. This means that the transfer of processing data will continue, even if there is no processing data in the previous-stage register. As a result, if there is a register to which processing data has not been input, the presence of a register without processing data is noted during the pipeline processing, and it becomes impossible to implement equalization of the load of data processing, which is the objective of pipeline processing.

The description now turns to the data-driven pipeline processing device, but first deals with the defect that the control and configuration methods thereof are not very simple. In other words, the device of this method must be provided with a control circuit for controlling the flow of processing data such that it proceeds onward only if there is processing data in the previous stage. However, when such a control circuit is provided, decisions as to what configuration and control method to use are not easy problems to solve. To ensure that this control circuit can be connected to all the registers 460 to 463 and reduce the load on the hardware, it is necessary to make the configuration thereof as simple as possible and reduce the number of circuits, but these points cause major technical problems.

The flow of a data-driven pipeline processing device can only proceed forward if there is data in the previous stage. Therefore, processing data in the register 461 can only be transferred to the data processing sections 466, 667, and 468 and the registers 462 and 463 of the next stages if there is processing data in the register 460. Therefore, if the need arises to transfer data from the register 461 to the next stage, regardless of the state of the previous stage, it becomes impossible to implement an increase in the efficiency of the pipeline processing, and it also becomes impossible to implement optimization of the processing time of the overall device.

Thus, a clock-driven pipeline processing device has the advantage of a simple control method, but it also has a disadvantage in that it is difficult to implement equalization of the pipeline processing. Conversely, a data-driven pipeline processing device has the advantage of enabling implementation of a certain amount of equalization of the pipeline processing, but it has the disadvantages that the control method thereof is not simple and, in some cases, it becomes impossible to optimize the pipeline processing overall. Therefore, it is desirable to have a pipeline processing device that provides the advantages of both types of pipeline processing, such as a pipeline processing device capable of mixing these two pipeline processing methods.

DISCLOSURE OF THE INVENTION

This invention was devised in the light of the above described problems and has as its objective the provision of a pipeline processing device that enables the implementation of optimization of pipeline processing and that also has a simple configuration and control method, as well as a clipping processing device and pipeline processing method that use the pipeline processing device of this invention.

In order to achieve the above objective, a first aspect of this invention concerns a pipeline processing device for transferring processing data by pipeline processing, comprising:

a plurality of pipeline registers for sequentially transferring processing data in which a plurality of data items are formed into one string; and a pipeline control means to which a pipeline drive signal and a flash signal are input, for controlling data transfer in the pipeline registers on the basis of the pipeline drive signal and the flash signal;

wherein each of the pipeline control means comprises:

means for permitting data transfer to one pipeline register among the plurality of pipeline registers only when there is processing data in a pipeline register in a stage previous to the one pipeline register, when the pipeline drive signal has been enabled; and means for automatically extracting from the plurality of pipeline registers one string of processing data that has already been input, when the flash signal has been enabled, regardless of whether the pipeline drive signal is enabled or disabled.

In accordance with this aspect of the invention, processing data is transferred only when there is processing data in the previous stage, and processing data in which a plurality of data items are formed into one string can be automatically extracted after the input thereof has ended, by enabling the flash signal. In other words, since data transfer is always performed only when there is processing data in the previous stage when a pipeline drive signal is enabled (asserted), the pipeline processing load is equalized and processing can be made faster. On the other hand, processing data for which input has ended can be automatically extracted by enabling the flash signal, regardless of whether or not there is processing data in the previous stage, thus enabling the processing data to be used rapidly by the next process. As a result, this invention provides the optimal pipeline processing device for image calculation processing that particularly requires real-time calculation processing, such as in a clipping processing device.

A second aspect of this invention concerns a pipeline processing device for transferring processing data by pipeline processing, comprising:

- a plurality of pipeline registers using a transfer clock to sequentially transfer processing data in which a plurality of data items are formed into one string; and
- a plurality of pipeline control means, each connected to one of the plurality of pipeline registers, for generating and outputting a signal that enables data transfer to the connected pipeline register, using the transfer clock, wherein each of the pipeline control means comprises:

- a pipeline drive permitting means for generating a signal that permits data transfer to a pipeline register to which a pipeline control means is connected, when either an input pipeline drive signal or input flash signal that is input from a previous-stage pipeline control means has become enabled, and also holding the input pipeline drive signal in a first memory means, and enabling an output pipeline drive signal that is output to a subsequent-stage pipeline control means, when both an input pipeline drive signal held at previously permitted data transfer in the first memory means and the input pipeline drive signal from the previous-stage pipeline control means are enabled; and
- a flash permitting means for holding the input flash signal that is input from the previous-stage pipeline control means in a second memory means and enabling an output flash signal that is output to the subsequent-stage pipeline control means, when either an input flash signal that was held in the second memory means one transfer clock period previously or the input flash signal from the previous-stage pipeline control means is enabled.

This aspect of the invention first of all implements data-driven pipeline processing as described below. When an input pipeline drive signal of the first-stage pipeline control means is enabled (for example, set to 1), data transfer to the first-stage pipeline register is permitted and also 1 is stored in the first-stage first memory means. If the input pipeline drive signal then becomes 1, both the previous and current input pipeline drive signals of the first-stage pipeline control means are 1, and thus the output pipeline drive signal also becomes 1. This permits data transfer to the second-stage pipeline register. As described above, this invention ensures that processing data is transferred only when there is processing data in the previous stage, thus implementing data-driven pipeline processing.

On the other hand, automatic extraction of processing data is also implemented by this invention. When the input flash signal of the first-stage pipeline control means becomes 1, all of the input flash signals of the second stage onward become 1, and thus data transfer is permitted for all of the pipeline registers. This input flash signal is held in the second memory means. This enables the output flash signal for one transfer clock period longer at each stage, so that the first-stage output flash signal is enabled for at least one transfer clock period and the second-stage one is enabled for at least two transfer clock periods. Thus, all of the processing data that is in the pipeline registers at the point at which the flash signal is enabled can be automatically extracted.

In a third aspect of this invention, the pipeline drive permitting means comprises means for clearing data held in the first memory means, wherein initialization of the pipeline processing device is performed by the data clearing means clearing the data held in the first memory means.

In accordance with this aspect of the invention, the data held in the first memory means is cleared by the data clearing means. This enables a return to an initial state in which no processing data, which is to be subjected to data-driven pipeline processing, has been input. In this case, all the data that is already in the pipeline registers can be automatically extracted while new data is input to the pipeline registers, by, for example, enabling both the clear signal and the flash signal.

A fourth aspect of this invention concerns a clipping processing device for performing clipping processing using a plurality of clipping surfaces with respect to a three-dimensional object that is represented by a plurality of polygons, comprising:

- inside/outside decision means for determining whether or not a polygon is divided by a clipping surface, on the basis of input polygon image data;
- interior-division-point calculation means for using the input polygon image data to calculate interior division points for the polygon, when the inside/outside decision means determines that the polygon is divided; and
- output control means for generating a pipeline drive signal and a flash signal and outputting the signals to the interior-division-point calculation means;

wherein the interior-division-point calculation means comprises:

- a plurality of pipeline registers for sequentially transferring polygon image data in which a plurality of data items are formed into one string; and
- pipeline control means to which the pipeline drive signal and the flash signal are input from the output control means, for controlling data transfer in the pipeline registers on the basis of the pipeline drive signal and the flash signal;

wherein each of the pipeline control means comprises:

- means for permitting data transfer to one pipeline register among the plurality of pipeline registers only when there is polygon image data in a pipeline register in a stage previous to the one pipeline register, when the pipeline drive signal has been enabled; and
- means for automatically extracting from the plurality of pipeline registers one string of polygon image data that has already been input, when the flash signal has been enabled, regardless of whether the pipeline drive signal is enabled or disabled.

In accordance with this aspect of the invention, the interior-division-point calculation processing of the clipping processing device can implement a pipeline processing method that enables data-driven pipeline processing and also enables automatic extraction by the flash signal. Since the polygon image data used in a clipping processing device is an extremely long data string in which a plurality of data items are grouped together, the clipping processing method of this invention is extremely effective for such data.

In a fifth aspect of this invention, the interior-division-point calculation means comprises a division means for performing a division that divides a distance between vertex coordinates of a polygon; and the output control means comprises means for detecting completion of a division performed by the division means and means for enabling the pipeline drive signal when division completion has been detected by the detection means.

With this invention, division processing by the interior-division-point calculation means takes the most time, and it is impossible for subsequent data processing until the result of this division processing is output. In such as case, the interior-division-point calculation processing is performed by the data-driven pipeline method. In other words, the output control means enables the pipeline drive signal after detecting division completion, to cause the polygon image data within the pipeline registers to be shifted one stage forward. On the other hand, when interior-division-point calculation processing ends for one string of polygon image data, the polygon image data is automatically extracted by enabling the flash signal, regardless of whether the pipeline drive signal is enabled or disabled, in other words, without waiting for the division means to complete the division, implementing an increase in the processing speed.

A sixth aspect of this invention further comprises means for re-inputting polygon image data for which clipping processing using one clipping surface has ended to the inside/outside decision means and the interior-division-point calculation means, and thus subjecting the polygon image data to clipping processing using another clipping surface.

This aspect of the invention makes it possible for clipping processing to be performed for a plurality of clipping surfaces by a single clipping processing device, and also enables perspective projection conversion processing. Since this invention enables the automatic extraction of one string of polygon image data by the flash signal, polygon image data that has been subjected to clipping processing in accordance with one clipping surface can be immediately subjected to clipping processing by another clipping surface, thus enabling the implementation of an increase in the processing speed.

A seventh aspect of this invention concerns a three-dimensional simulator device comprising the above clipping processing device and further comprising:

image synthesis means for synthesizing a field-of-view image as seen from an observer within a virtual three-dimensional space, using a polygon that has been subjected to clipping processing by the clipping processing device.

In accordance with this aspect of the invention, the number of polygons that must be handled by the image synthesis means can be greatly reduced by performing clipping processing by a clipping processing device, enabling the provision of a three-dimensional simulator device that is capable of real-time image synthesis.

BRIEF DESCRIPTION OF THE DRAWINGS

FIG. 4 is a table for illustrating the basic operation of to this embodiment;

FIG. 5 is a table for illustrating the distinctive operation of this embodiment;

FIG. 14 is a schematic diagram for illustrating the clipping calculation method used in the clipping processing device;

FIG. 15, 15A and 15B are a block diagram of the concrete circuit configuration of the clipping processing device;

BEST MODE FOR CARRYING OUT THE INVENTION

1. Description of Pipeline Register Section and Pipeline Control Section

Figure 1:
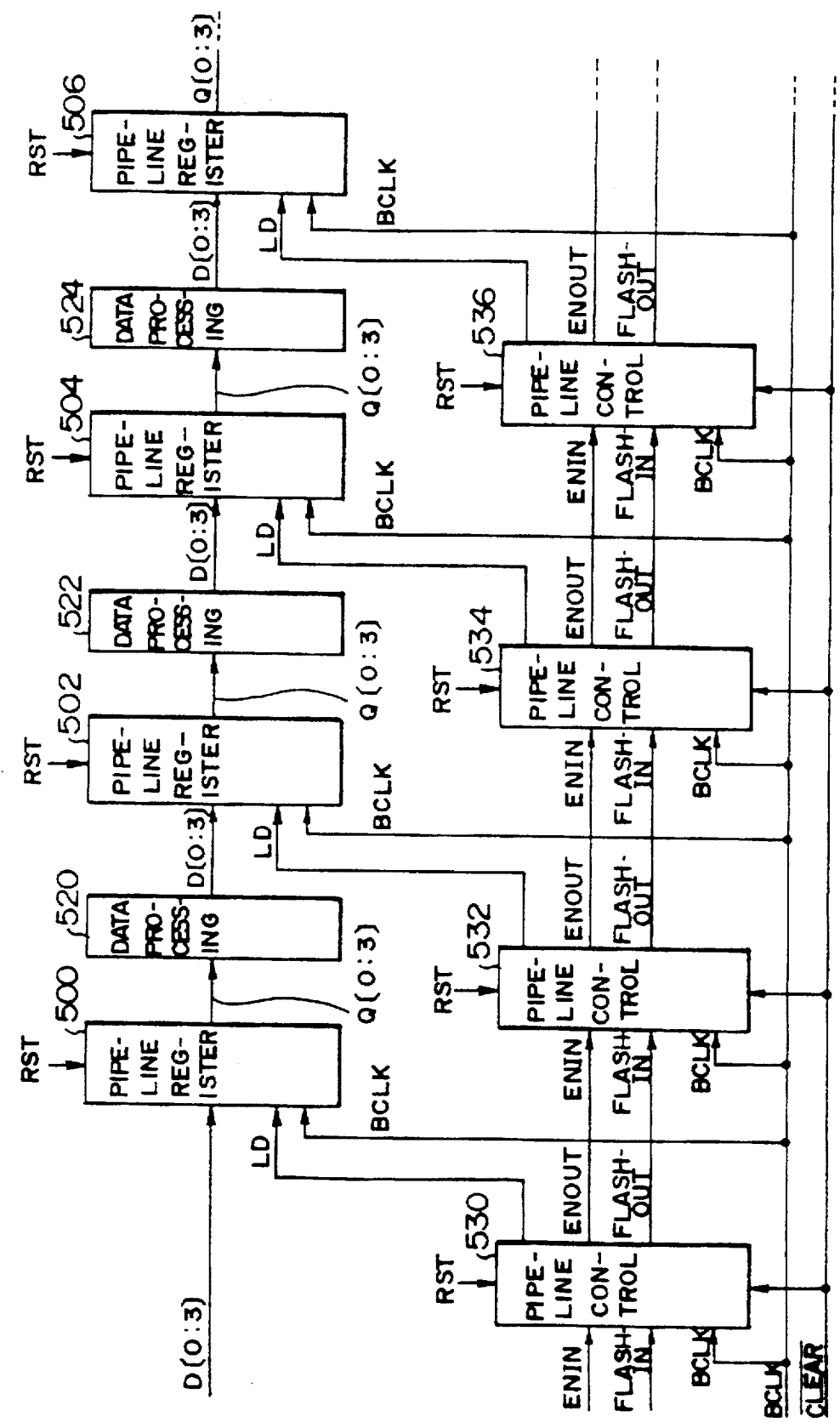
FIG. 1 is a block diagram of a preferred example of the pipeline processing device according to this invention.

A block diagram of an example of the pipeline processing device according to this invention is shown in FIG. 1. As shown in this figure, the pipeline processing device of this invention comprises pipeline register sections 500 to 506 and pipeline control sections 530 to 536. Data to be processed is supplied to data processing sections 520 to 524.

The pipeline register sections 500 to 506 each have the function of storing the processing data that is to be subjected to pipeline processing, and, to simplify the description, a case in which 4-bit data is subjected to pipeline processing is shown in FIG. 1. In other words, 4-bit input data D[0:3] is input to each of the pipeline register sections 500 to 506, and the subsequent-stage data processing section outputs output data Q[0:3]. Note, however, that the data processing sections 520 to 524 do not perform any data processing-if the data is shifted without modification, the output data Q[0:3] will be input as is to the subsequent-stage pipeline register.

The transfer of data in the pipeline register sections 500 to 506 is performed by a clock signal BCLK that acts as a transfer signal. However, this data transfer by the clock signal BCLK is enabled only when transfer is permitted by a transfer permitting signal LD. This transfer permitting signal LD is generated by the pipeline control sections 530 to 536.

The pipeline control sections 530 to 536 have the function of controlling the pipeline processing of data in the pipeline register sections 500 to 506. This control is performed by generating the transfer permitting signal LD, then enabling or disabling the data transfer in the pipeline register sections 500 to 506 by this signal.

To each of the pipeline control sections 530 to 536 is input the clock signal BCLK for providing clock synchronization, an input pipeline drive signal ENIN for performing pipeline drive, and an input flash signal FLASHIN for performing a flash operation. The transfer permitting signal LD, an output pipeline drive signal ENOUT, and an output flash signal FLASHOUT are generated from these input signals. The transfer permitting signal LD is output to the pipeline register sections and data transfer is enabled or disabled thereby. The output pipeline drive signal ENOUT and output flash signal FLASHOUT are input as the input pipeline drive signal ENIN and input flash signal FLASHIN, respectively, to the subsequent-stage pipeline control section.

Note that a RST signal is input to the pipeline register sections 500 to 506 and the pipeline control sections 530 to 536, to perform an initialization reset at power-on. A signal that is the inverse of a CLEAR signal (hereinafter expressed as the *CLEAR signal) is input to the pipeline control sections 530 to 536, to enable the clearing of the contents of the pipeline control sections 530 to 536 at a preferred timing during data processing. This makes it possible to re-execute data processing by first clearing the control details for the processing of data that has been sequentially stored in the pipeline control section, then using the initial-state control details.

Figure 2:
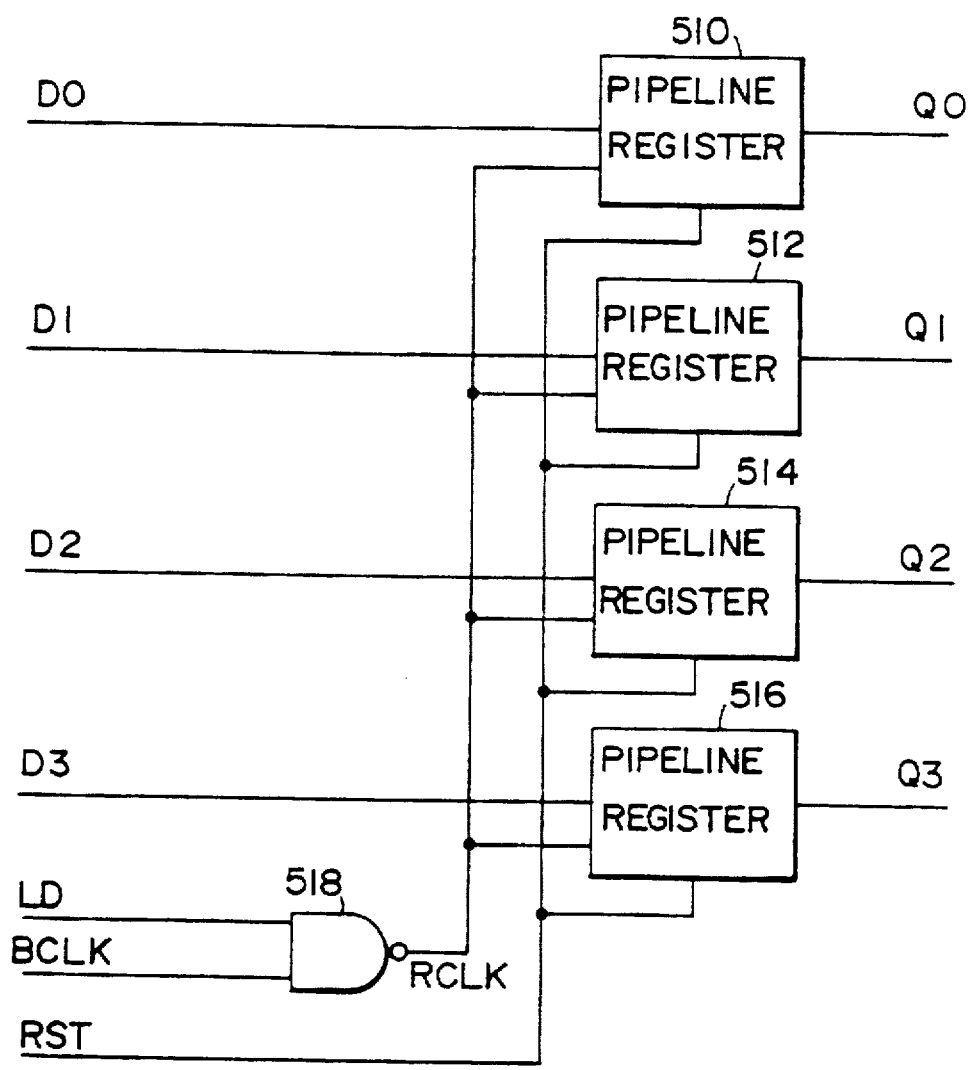
FIG. 2 is a block diagram of an example of the pipeline register section.

Details of the configuration of the pipeline register sections 500 to 506 are shown in FIG. 2. As shown in this figure, each of the pipeline register sections 500 to 506 is comprises pipeline registers 510 to 516 for holding or transferring data and a NAND circuit 518 that generates a transfer clock RCLK for these pipeline registers 510 to 516.

The input data D[0:3] is input to the pipeline registers 510 to 516, it is held in accordance with the transfer clock RCLK, and is transferred to the subsequent stage as the output data Q[0:3].

The transfer permitting signal LD and the clock signal BCLK are input to the NAND circuit 518. The clock signal BCLK is valid only when the transfer permitting signal LD is 1, whereupon the transfer clock RCLK is generated. This enables or disables data transfer.

Figure 3:
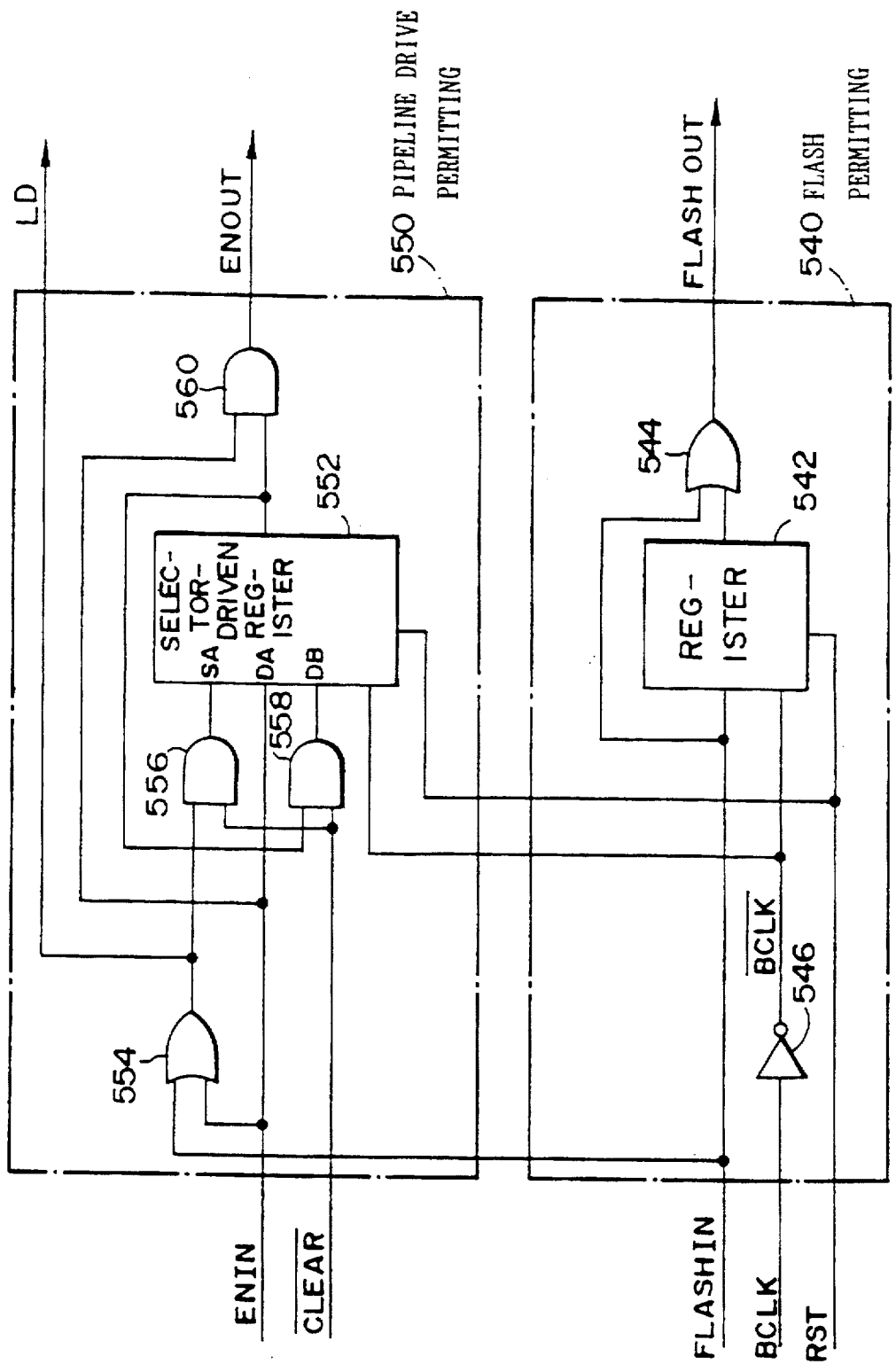
FIG. 3 is a block diagram of an example of the pipeline control section.

Details of the configuration of the pipeline control sections 530 to 536 are Shown in FIG. 3. As shown in this figure, each of the pipeline control sections 530 to 536 comprises a flash permitting section 540 and a pipeline drive permitting section 550. Note that an inverter circuit 546 is provided to generate a signal that is the inverse of the clock signal BCLK (hereinafter expressed as *BCLK).

The flash permitting section 540 has the function of generating the output flash signal FLASHOUT from the input flash signal FLASHIN, and comprises a register 542 and an OR circuit 544. The input flash signal FLASHIN is held in the register 542 in synchronization with the *BCLK signal, then it is output to the OR circuit 544. If either the FLASHIN signal or the data stored in the register 542 is enabled (if it is 1), the OR circuit 544 enables the FLASHOUT signal. This FLASHOUT signal becomes the FLASHIN signal for the subsequent-stage pipeline control section, and acts as a signal that enables the flash operation of the subsequent stage.

The pipeline drive permitting section 550 is comprises a selector-driven register (register with selector) 552, AND circuits 556, 558, and 560, and an OR circuit 554.

The LD signal is generated by the OR circuit 554 if either the input pipeline drive signal ENTN or the input flash signal FLASHIN is enabled (if it is 1) and is output to the pipeline register section and the AND circuit 556. This causes the pipeline drive of the pipeline register section in this stage to be permitted.

The data input to a DA pin is held by the selector-driven register 552 if an SA pin thereof is at 1, or the data input to a DB pin thereof is held if the SA pin is at 0. An output of the AND circuit 556 is input to this SA pin and the LD and CLEAR signals are input to this AND circuit 556. The ENIN signal is input to the DA pin. An output of the AND circuit 558 is input to the DB pin and an output of the selector-driven register 552 and the *CLEAR signal are input to this AND circuit 558.

This configuration ensures that both the SA and DB pins become 0 if the *CLEAR signal is 0, and the data stored in the selector-driven register 552 is thus cleared.

If either the ENIN signal or the FLASHIN signal becomes 1 and the LD signal becomes 1, the SA pin goes to 1, the contents of the ENIN signal are stored, and the data stored the selector-driven register 552 is updated. Conversely, the LD signal becomes 0, the data output from the selector-driven register 552 is fed back to the input thereof, and thus the previous stored data is held.

If both the ENIN signal and the output of the selector-driven register 552 are 1, in other words, if the data in both the previous-stage pipeline register section and the pipeline register section of this stage is enabled, the output pipeline drive signal ENOUT is enabled. This ENOUT signal becomes the ENIN signal for the subsequent-stage pipeline control section, and acts as a signal that enables the pipeline drive of the subsequent stage.

The operation of the pipeline processing device of this invention will now be described using FIG. 4 and FIG. 5. The basic operation of the pipeline processing device of this invention is shown in FIG. 4. A1, A2, A3, . . . An represent items of actual processing data stored in the pipeline register sections 500 to 506. As shown in this figure, if the ENIN signal is in an active state (1), transfer by that pipeline register section is enabled and the data stored in the pipeline register section is transferred to subsequent stages, one stage at a time. For example, the ENIN signal becomes 1 at a time 1 in this figure, the processing data A1 is input to the first-stage pipeline register section at a next time 2. In the same manner, since the ENIN signal is 1 at times 3 and 4, the processing data A2 and A3 is input to this device at times 4 and 5, respectively, and the already-input processing data is sequentially shifted to subsequent stages.

After the end of the input of processing data A1 to A3 wherein a plurality of data items is formed into one string, as shown in this figure, the FLASHIN signal goes to an active state (1). The thus-input processing data A1 to A3 is automatically extracted, regardless of the ENIN signal. In the example shown in FIG. 4, the FLASHIN signal goes to 1 at a time 6. This causes the processing data A1 to A3 to be sequentially transferred to subsequent stages in synchronization with the clock signal BCLK from a time 7, thus causing it to be automatically extracted.

The distinctive operation of the pipeline processing device of this invention is further illustrated in FIG. 5. Since the ENIN signal becomes 1 at times 1, 3, and 4, processing data A1 to A3 is input at those times. At the time 6, the ENIN and FLASH signals become 1 simultaneously. This means that the next processing data B1 can be input to the pipeline processing device at the same time that the input of the processing data A1 to A3 ends. Therefore, the processing data B1 is input to the first stage at the time 7. The processing data A3 is also transferred to the second stage. At the time 7, the ENIN signal is no longer in the active state. Therefore, the processing data B1 is held as is in the first stage at a time 8. In contrast thereto, since the processing data A1 to A3 has already been driven once by the FLASH signal, it is sequentially shifted to subsequent stages in synchronization with the clock signal BCLK, regardless of state of the ENIN signal, and is thus automatically extracted to the outside.

Since the pipeline processing device of this invention has the above described characteristic, there is no necessity for the previous-stage control section that controls this device to provide further control over this processing data, beyond simply setting the FLASH signal to 1 after the output of the processing data has ended. Therefore, the previous-stage control section that controls this device need only control the next processing data to be output. As a result, the circuit configuration can be made extremely simple, the size of the circuitry can be made extremely small, and also, since it is no longer necessary to design complicated control circuitry, a shortening of the design period can be planned.

2. Application to Clear Operation

To clear the pipeline processing details and re-execute the pipeline processing anew in a prior-art pipeline processing device, it is necessary to clear the entire contents of the pipeline register sections. If the contents recorded in the pipeline register sections are completely cleared in this manner, the data stored in the pipeline register sections before the clear operation will be lost. However, depending on circumstances, it is possible that it is desired to enable this stored data as is, and clear only the pipeline processing details. In such a case, a method has been considered in which, for example, dummy data is input to the head of the pipeline register sections to push out the necessary data, but this necessitates wasted operations and time. With the pipeline processing device of this invention, the processing data within the pipeline register sections remains valid and only the pipeline processing details are cleared in such a case, so that, after the clear, new data can be input immediately and the pipeline processing can be re-executed. The operation of the pipeline processing device of this invention in such a case is described below.

The timing of the basic operation of the pipeline processing device of this invention, shown in FIG. 6, will first be described. This operation is one in which the FLASH signal is not input at all.

At a time 1, the *CLEAR signal is negated, enabling preparation for the input of processing data. In this case, "negate" means that the signal is changed from a logically active state to a state in which it is not active.

Next, at a time 2, the ENIN signal is asserted by the previous-stage pipeline control section, to indicate that processing data has arrived in the previous-stage pipeline register section. In this case, "assert" means that the signal is changed from a state in which it is not logically active to an active state. If the ENIN signal is asserted in this manner, the LD signal is asserted by the OR circuit 554 shown in FIG. 3 and processing data is fetched into the pipeline register section of this stage. However, since there is no valid data in this stage at the time 2, the ENOUT signal that outputs to the subsequent stage is not asserted. In other words, the ENIN signal that indicates whether or not the previous-stage processing data is valid is asserted but the output of the selector-driven register 552 that indicates whether or not the processing data of this stage is valid is not asserted, so that the output of the AND circuit 560 is not asserted either.

Next, the ENIN signal is asserted at a time 3, so that processing data is input from the previous stage. In this case, information that the processing data for this stage is valid has already been stored in the selector-driven register 552 at the time 2. Therefore, the output of the selector-driven register 552 is asserted and the output of the AND circuit 560 is asserted. As a result, the ENOUT signal is output for transferring the this-stage data to the next stage.

At a time 4, processing data is not input from the previous stage and the ENIN signal is not asserted. Therefore, the ENOUT signal that is the output of the AND circuit 560 is not asserted.

The ENIN signal is again asserted at a time 5, and this causes the ENOUT signal to be asserted immediately. This point differs from the above described time 2 in that the ENOUT signal is immediately asserted. It is because the output of the selector-driven register 552 indicating whether or not the processing data of this stage is valid has already been asserted at the time 5.

At a time 8, the *CLEAR signal is asserted and this clears all the pipeline registers section 500 to 506 again.

New processing data is input from a time 10.

When the *CLEAR signal was input at the time 8, the processing data of this stage and the processing data of the stages other than this stage was being held so that this processing data would be lost. Therefore, all this processing data must be output before the clear operation. One method that could be considered for performing this is to load data into the initial-stage pipeline register section to act as dummy data, and thus push out the necessary processing data. However, this method necessitates the leading of unnecessary data, which is time-consuming and makes the control complicated. The pipeline processing device of this invention is designed to use the FLASH signals (the FLASHIN signal and FLASHOUT signal) in such a case. A timing chart of signals, including these FLASH signals, is shown in FIG. 7.

Figure 6:
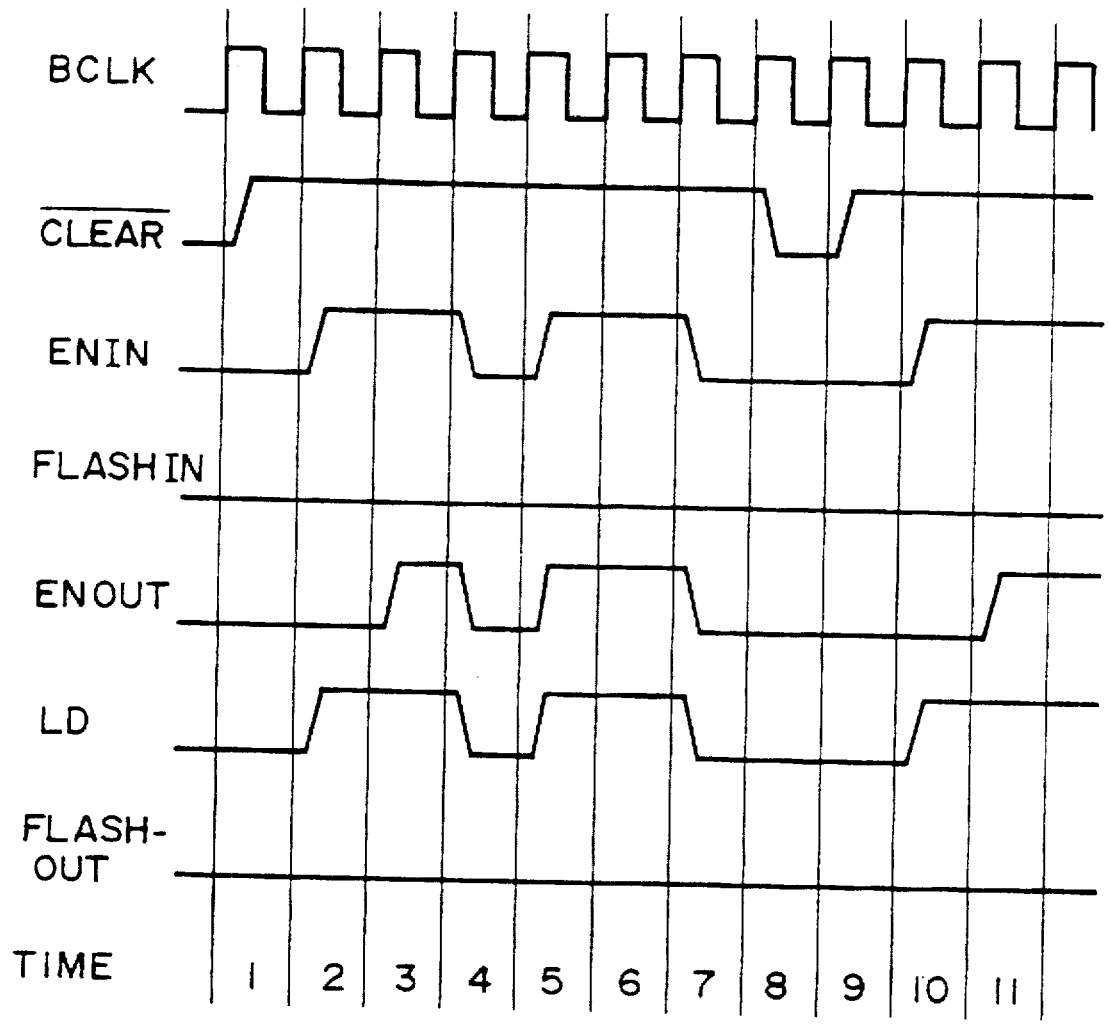
FIG. 6 is a timing chart of the basic operation of this embodiment.
Figure 7:
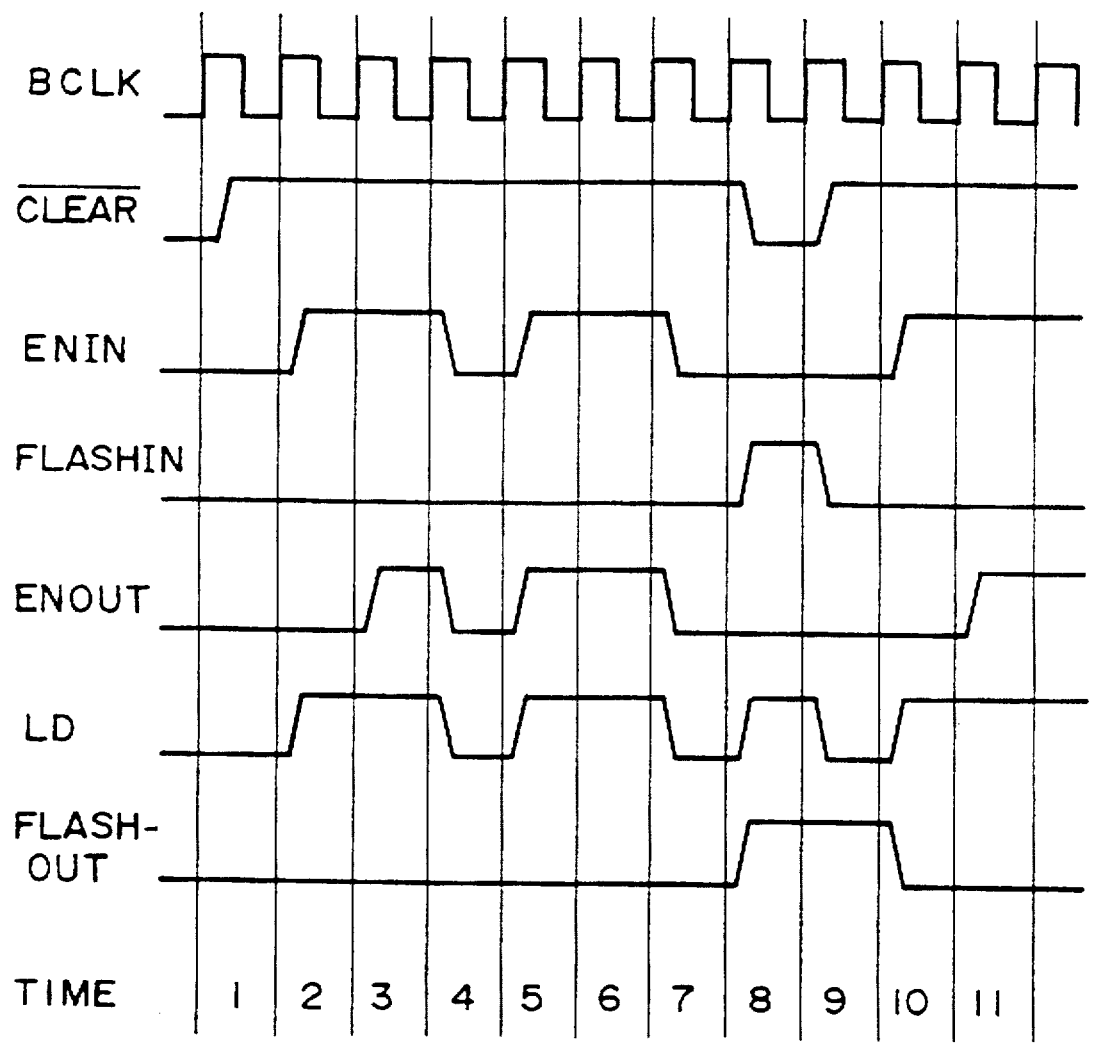
FIG. 7 is a timing chart of the distinctive operation of this embodiment.
Figure 8:
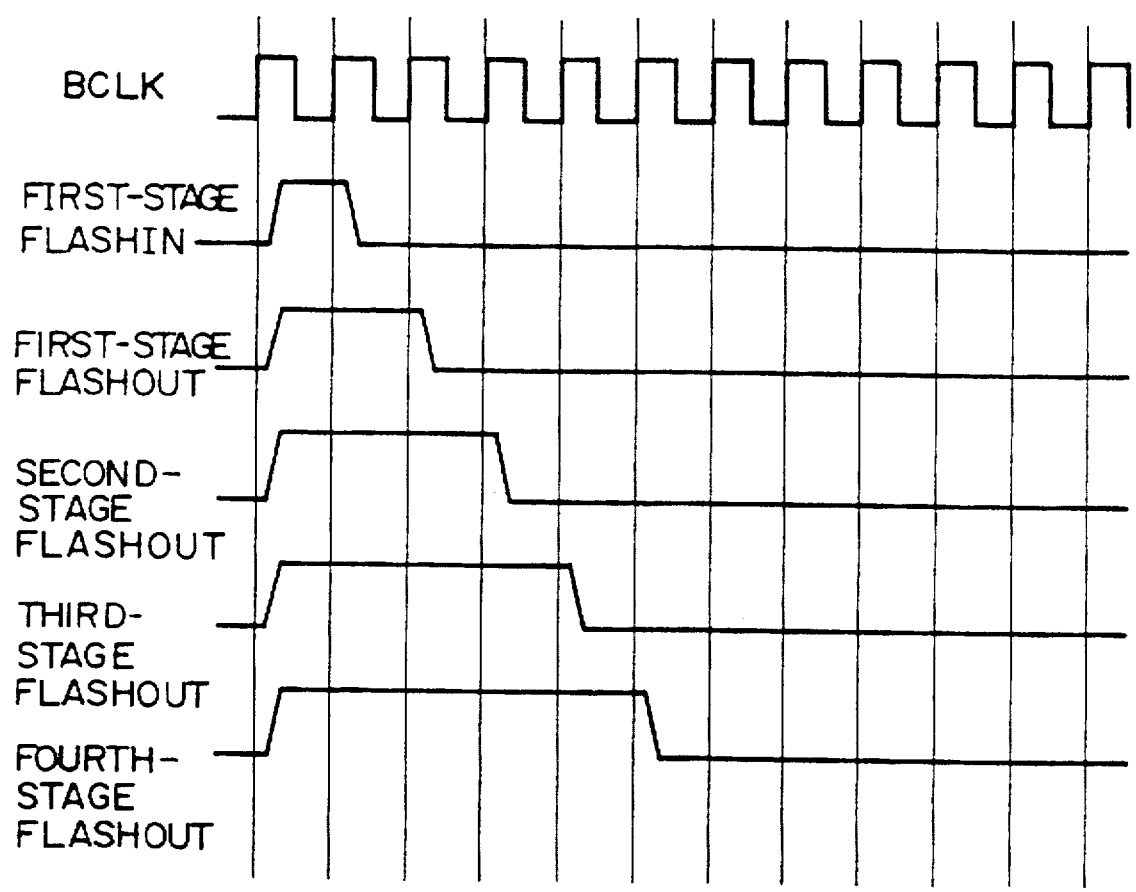
FIG. 8 is a timing chart of the state of the flash signal in the next stage after the flash signal is asserted.

FIG. 7 differs from FIG. 6 in that the FLASHIN signal is also asserted at the same time that the *CLEAR signal asserted. If the FLASHIN signal is asserted, the LD signal also asserted by the OR circuit 554, so that the previous-stage processing data is transferred to the subsequent stage and is stored therein. This FLASHIN signal is also stored by the register 542 and the design is such that a two-clock long FLASHOUT signal is output. The time during which the FLASHOUT signal is asserted is increased by one clock for each subsequent stage, as shown in FIG. 8.

This enables the pipeline register sections after this stage to extract all of the processing data up until this stage. In this case, the selector-driven register 552 to which the ENIN signal is input is cleared by the *CLEAR signal. Therefore, the LD signal is asserted only when there is once again processing data in the previous stage, even while the flash operation is being performed and processing data being automatically extracted (time 10 in FIG. 7). More accurately, the pipeline control section of this stage can operate at a time 9 in exactly the same manner as usual, since the initialization has already ended at that point. The next-stage pipeline control section also returns to normal operation at the time 10. Similarly, the next-stage pipeline control section can also return to the normal state at a time 11. This illustrates that normal operation can be ensured from the time 9 for the pipeline processing device of this invention, even when processing data is input at usual continuously to the first stage. This enables pipeline processing on the input processing data in the previous stage in the usual manner after the clear operation, while performing a FLASH operation whereby processing data remaining in the pipeline register section of the subsequent stage is automatically extracted.

3. Application to Clipping Processing

The description below concerns an example of the application of the pipeline processing device of this invention to clipping processing during image processing.

1) Description of Overall 3D Simulator Device

The overall configuration of a 3D simulator device to which the pipeline processing device of this invention is applied will first be described.

Figure 9:
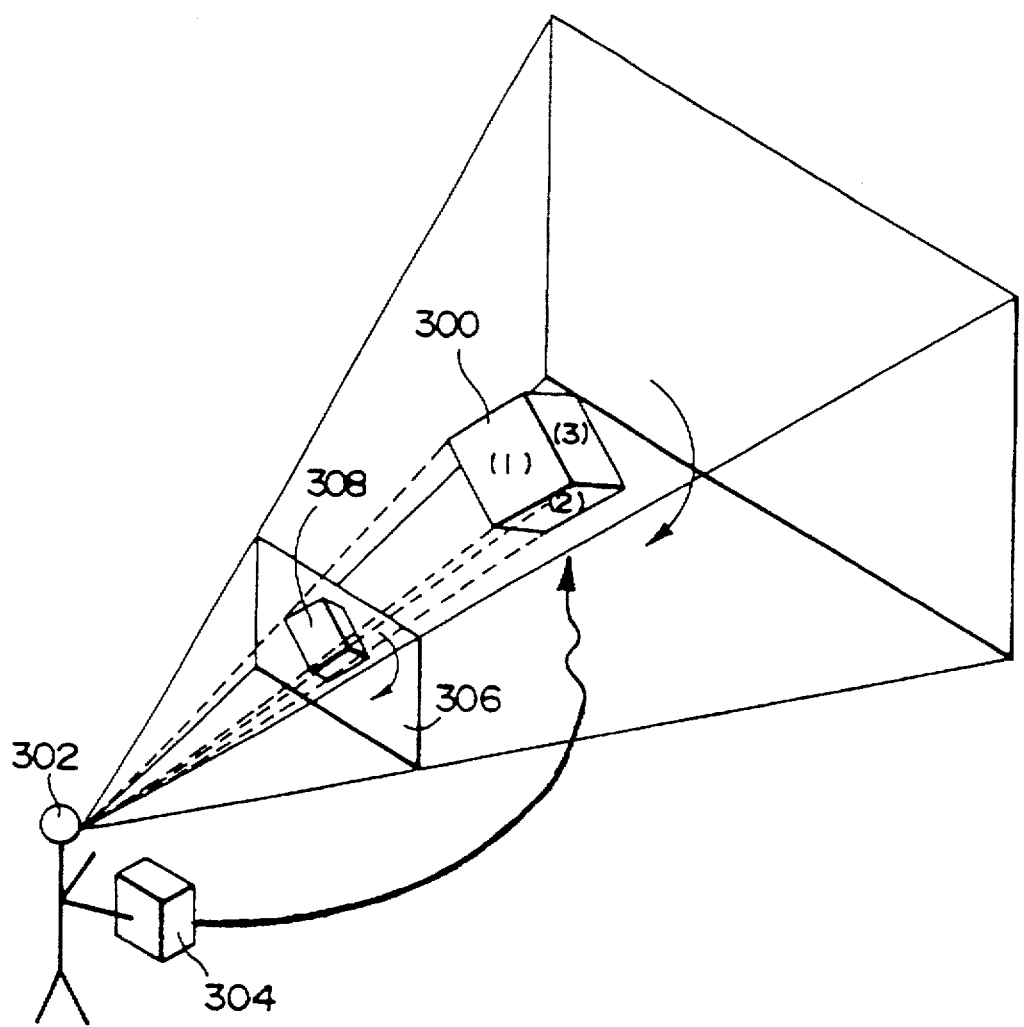
FIG. 9 illustrates the concept of a 3D simulator device to which this embodiment is applied.

Various applications are known in the prior art as 3D simulator devices used in, for example, 3D games or piloting simulators for aircraft or various vehicle. In a 3D simulator device of this type, image information relating to a 3D object 300, shown in FIG. 9, is previously stored in the device. This 3D object 300 represents a display object that a player (observer) 302 can see via a screen 306. Image information of the 3D object 300 is subjected to perspective projection conversion on the screen 306 so that a pseudo-3D image (projected image) 308 is displayed on the screen 306. With this device, if the player 302 performs an operation such as a rotation or translation using a control panel 304, given 3D calculation processing is performed on the basis of a control signal thereof. A calculation is first performed to determine whether there is a change in a factor such as the viewpoint position or line-of-sight direction of the player 302 or the position or direction of the moving vehicle in which the player 302 is seated. Next, a calculation is performed to determine how the image of the 3D object 300 will appear on the screen 306 in response to this change in the viewpoint position and line-of-sight direction, or other change. The above calculation processing is performed in real time to follow the actions of the player 302. This enables the player 302 to pseudo-experience a virtual 3D space in which a change in scenery concomitant with a change in the player's own viewpoint position and line-of-sight direction or a change in the position and direction of the moving vehicle can be seen in real time as a pseudo-3D image.

Figure 10:
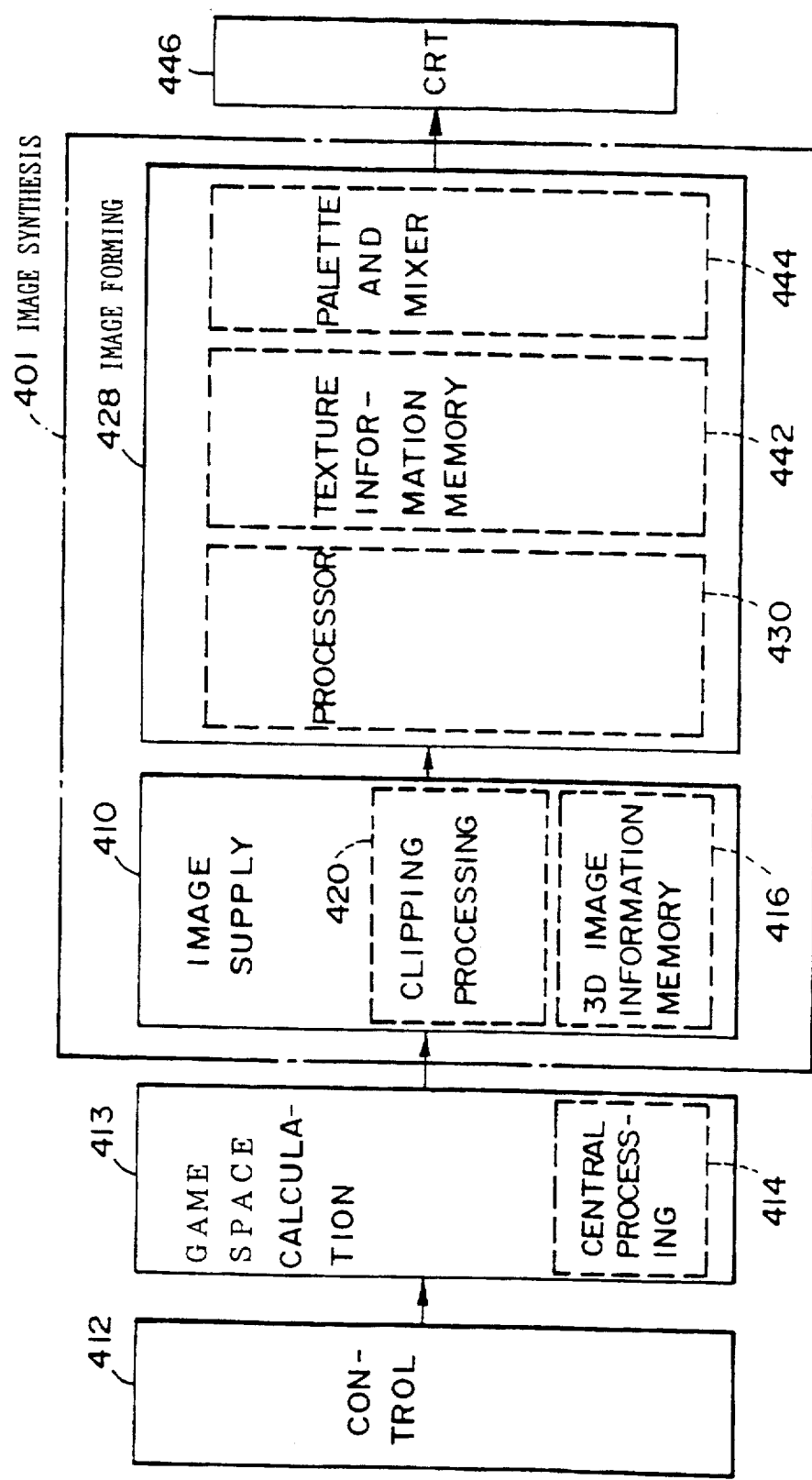
FIG. 10 is a schematic block diagram of an example of the 3D simulator device to which this embodiment is applied.

An example of the 3D simulator device of this invention is shown in FIG. 10. Note that the description below proceeds on the assumption that the 3D simulator device is applied to a 3D game.

As shown in FIG. 10, the 3D simulator device of this invention is configured of a control section 412, a virtual 3D space calculation section 413, an image synthesis section 401, and a CRT 446.

The virtual 3D space calculation section 413 sets a virtual 3D space in accordance with control signals from the control section 412 and a games program stored in a central processing section 414. In other words, it performs calculations to determine what the position of the 3D object 300 is and in what direction is it arranged.

The image synthesis section 401 comprises an image supply section 410 and an image forming section 428. The image synthesis section 401 performs image synthesis of a pseudo-3D image in accordance with setting information on a virtual 3D space from a virtual 3D space calculation section 413.

3D objects that configure a virtual 3D space are represented by this 3D simulator device as polyhedrons divided into 3D polygons. For example, the 3D object 300 shown in FIG. 9 is represented as a polyhedron divided into 3D polygons (1) to (6) (polygons (4) to (6) are not shown in the figure). Coordinates and accompanying data (hereinafter called vertex image information) for each vertex of these 3D polygons are stored in a 3D image information memory section 416.

Various types of calculation such as rotation or translation with respect to this vertex image information and various types of coordinate conversion such as perspective projection conversion are performed by the image supply section 410 in accordance with setting information of the virtual 3D space calculation section 413. After the vertex image information that has been subjected to this calculation processing has been converted in line with a given sequence, it is output to the image forming section 428.

Intra-polygon image information is calculated by the image forming section 428 from polygon data such as vertex coordinates. This image information is converted into RGB data by a palette and mixer circuit 444, then an image is output from the CRT 446.

In the 3D simulator device of the above configuration, the image supply section 410 performs the calculations described below.

Figure 11:
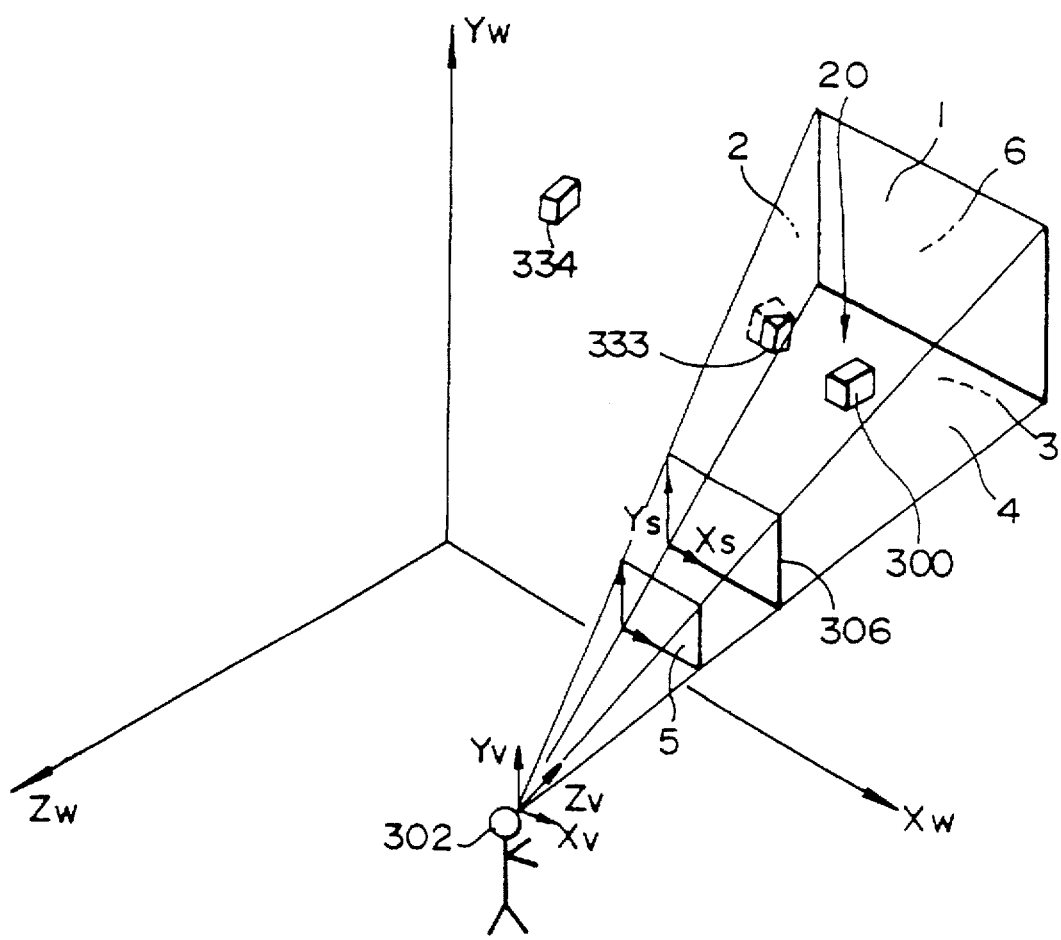
FIG. 11 illustrates the image processing calculations performed by the 3D calculation section.

Taking a driving game as an example, as shown in FIG. 11, 3D objects 300, 333, and 334 representing objects such as a steering wheel, a building, and a billboard, which are read out from the 3D image information memory section 416 are arranged in a 3D space expressed by a world coordinate system (XW, YW, ZW). Subsequently, image information representing those 3D objects is subjected to coordinate conversion to a viewpoint coordinate system (Xv, Yv, Zv) based on the viewpoint of the player 302.

Next, a type of image processing that is called clipping processing is performed. In this case, clipping processing is image processing whereby image information that is outside the field of view of the player 302 (or outside the field of view of a window opening into the 3D space), in other words, image information that is outside a region bounded by clipping surfaces 1, 2, 3, 4, 5, and 6 (hereinafter called a display region 20), is excluded. The image information necessary for subsequent processing by this 3D simulator device is only the image information that is within the field of view of the player 302. This means that, if any other information could be excluded, the load during subsequent processing could be reduced. Although there are objects in all directions around the player 302, if it could be arranged such that only those of the objects that are within the field of view are processed, the quantity of data to be processed subsequently can be greatly reduced, so that a 3D simulator device that performs read-time image processing, in particular, executes only essential image processing.

This is described below in more detail with reference to FIG. 11. Image information on an object outside the field of view of the player 302 (outside the display region 20), such as the 3D object 334 representing a billboard that has moved out of the field of view and backwards, is excluded. This exclusion processing is performed by determining whether or not an object is within a display region for each of the clipping surfaces 1 to 6, then excluding the object only if it is outside all of those surfaces.

In contrast thereto, for the 3D object 333 of a building or the like that is on the boundary of the display region 20, the part thereof that is outside the display region 20 is excluded, and only the part that is within the display region 20 is used in subsequent image processing. The image information of the 3D object 300 of the steering wheel or the like, which is completely included within the display region 20, is used as is in the subsequent image processing.

Finally, perspective projection conversion to the screen coordinate system (XS, YS) is performed only for objects within the display region 20, then sorting processing is performed.

Note that image synthesis is performed by methods called texture mapping and Gourand shading in this 3D simulator to provide a higher quality image.

Figure 12:
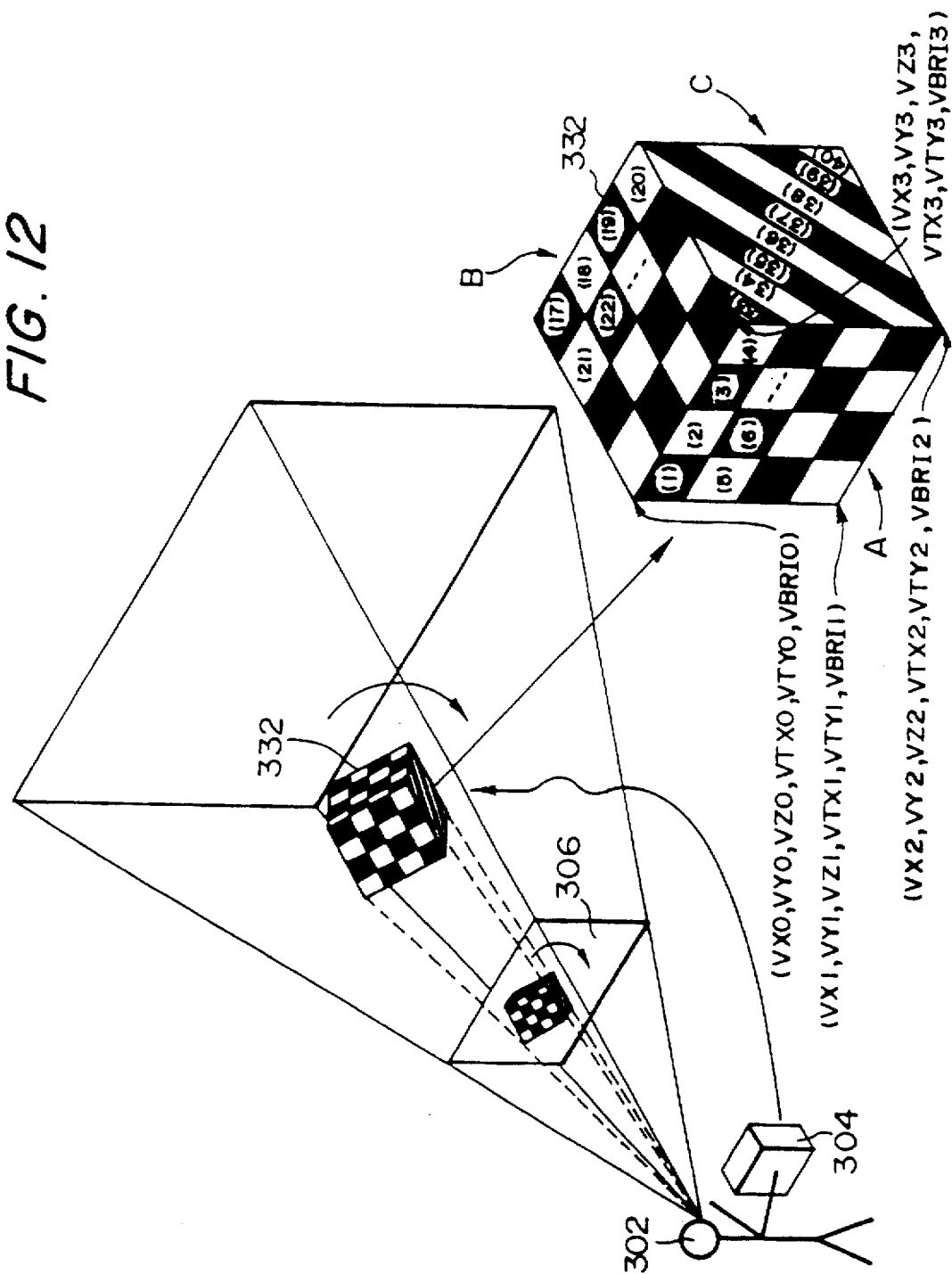
FIG. 12 illustrates the concept of texture mapping.

The concept of the texture mapping method is shown in FIG. 12.

In the prior art, to synthesize the image of a 3D object 332 having patterns such a checks or stripes, as shown in FIG. 12, the 3D object is divided into 3D polygons (1) to (80) (3D polygons (41) to (80) are not shown in the figure) and image processing is performed with respect to all of these polygons, because painting out one polygon can only be performed with one specified color. As a result, the number of polygons required to synthesize a high-quality image with a complicated pattern increases greatly, and thus it becomes impossible to synthesize a high-quality image of this type.

With this 3D simulator device processing such as rotation, translation, coordinate conversion for perspective projection conversion, and clipping of the 3D object 332 is performed for each of 3D polygons A, B, and C configuring the surfaces thereof, (to be specific, each of the vertices of these 3D polygons) and the checked or striped pattern is handled as a texture that is separated from the polygon processing. A texture information memory section 442 is provided within the image forming section 428 shown in FIG. 10, and image information (texture information) to be applied to each of the 3D polygons, such as a checked or striped pattern, is stored therein.

The address in the texture information memory section 442 that specifies this texture information is given as texture coordinates VTX, VTY for each vertex of each of the 3D polygons. More specifically, texture coordinates (VTX0, VTY0), (VTX1, VTY1), (VTX2, VTY2), and (VTX3, VTY3) are specified for each vertex of polygon A shown in FIG. 12.

Texture coordinates TX, TY for all of the dots within the polygon are obtained by s processor section 430 within the image forming section 428 from the texture coordinates VTX, VTY for each of these vertices. Texture information corresponding to the thus-obtained texture coordinates TX, TY is read out from the texture information memory section 442 and is output to the palette and mixer circuit 444. This enables the synthesis of a 3D object covered with a texture such as checks or stripes, as shown in FIG. 12.

The 3D simulator device represents the 3D object 332 as a 3D polygon solid as described above. Therefore the continuity of brightness information at boundaries of each 3D polygon causes a problem. For example, if an attempt is made to represent a sphere by using a plurality of 3D polygons and the same brightness is set for all the dots within each 3D polygon, a state would occur in which the boundaries of each 3D polygon would not be represented as "rounded," although it is desired to represent them as "rounded" in practice. The 3D simulator device of this invention avoids this problem by a method called Gourand shading. With this method, brightness information VBRI0 to VBRI3 for each vertex is given for each vertex of the 3D polygons, as shown in FIG. 12, in a similar manner to that of the above described texture mapping method, and brightness information for all the dots in the 3D polygon is obtained by interpolation from the brightness information VBRI0 to VBRI3 for each of these vertices when the image is finally displayed by the image forming section 428.

Figure 13A:
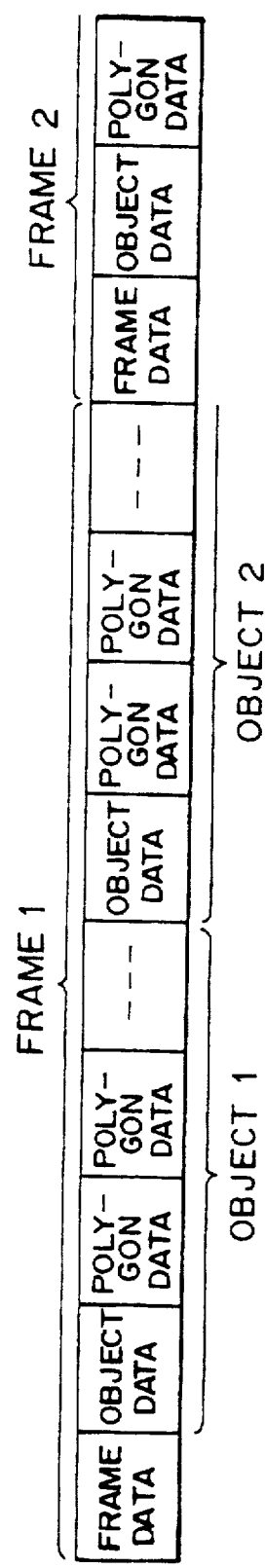
FIGS. 13A and 13B show an example of the format of data handled by the 3D simulator device.
Figure 13B:
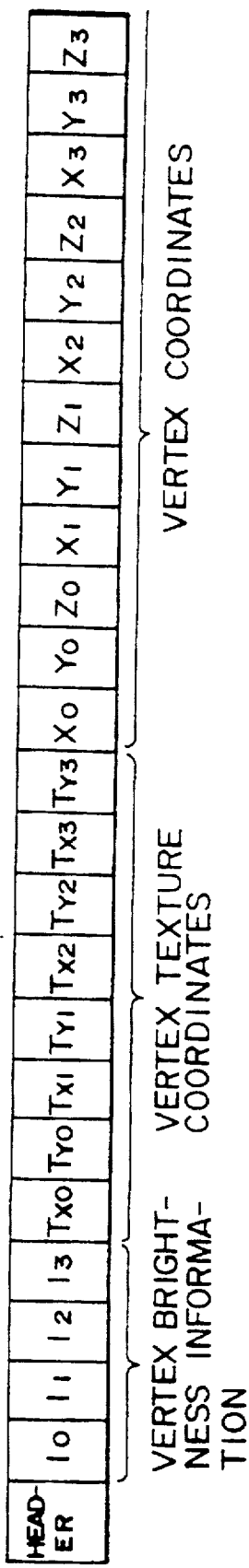

As described above, the 3D simulator device of this invention is configured to use texture mapping and Gourand shading methods to enable fast image processing of a high-quality image. Thus the polygon image information is configured as a plurality of data items formed into one string, such as vertex display coordinates, vertex texture coordinates, and vertex brightness information for each polygon. There is also object data that is common data for identical 3D objects and frame data that is common data for identical frames. An example of the data format therefor is shown in FIG. 13. However, a major technical problem concerns the question of how data, (which consists of a plurality of data items formed into one string, as shown in this figure) should be processed efficiently and appropriately within the image supply section 410.

Note that, in order to simplify the description below, vertex brightness information items VBRI0 to VBRI3 are represented in FIG. 13 as I0 to I3; vertex texture coordinates VTX0 to VTY3 are represented as TX0 to TY3; and vertex coordinates VX0 to VZ3 are represented as X0 to Z3.

2) Description of Clipping Processing Device

A clipping processing device 420 for performing clipping processing is incorporated in the image supply section 410, as shown in FIG. 10. The description below concerns this clipping processing device 420.

A. Clipping Processing Method

The clipping processing method of this embodiment will first be described with reference to FIG. 14. This figure shows the clipping of a polygon 70 by a clipping surface 1. In this figure, V0=(X0, Y0, Z0), V1=(X1, Y1, Z1), V2=(X2, Y2, Z2), and V3=(X3, Y3, Z3) are vertex coordinates of the polygon 70 and $h(V)=aX+bY+cZ+d$ is the plane equation of the clipping surface 1.

Inside/Outside Decision for Each Set of Vertex Coordinates

Simultaneously with the input of polygon data, an inside/outside decision is executed to determine whether vertex coordinates V0 to V3 are in a region outside the clipping surface 1 or in a region within that surface. For this purpose, the following calculations are first performed $$h(V0)=aX0+bY0+cZ0+d$$

$$h(V1)=aX1+bY1+cZ1+d$$

$$h(V2)=aX2+aX2+cZ2+d$$

$$h(V3)=aX3+bY3+cZ3+d$$

According to the above calculations, Vn is determined to be in the display region if h(Vn) is less than or equal to zero, or Vn is determined to be in the out-of-display region if h(Vn) is greater than zero. In the example shown in FIG. 14, since h(V0) and h(V3) are both greater than 0, it is determined that V0 and V3 are in the out-of-display region, whereas, since h(V1) and h(V2) are less than or equal to 0, it is determined that V1 and V2 are in the display region.

Interior-Division-Point Calculation

For a polygon 72 in FIG. 14 for which it has been determined that all vertices are in the display region, the configuration is such that all vertices are supplied as is to the next process (such as clipping processing and/or perspective projection conversion for the next plane). For a polygon 74 for which it has been determined that all vertices are in the out-of-display region, all vertices are excluded from the next process.

In contrast thereto, clipping points in other words, interior division points (divided points) Vk and vl, are obtained for the polygon 70 that has been clipped by the clipping surface 1. Vertices V0 and V3 are excluded from the subsequent processing, and interior division points Vk and Vl are made vertices of the polygon 70 instead and these are used in the subsequent processing.

To obtain the interior division points Vk and Vl interior division ratios tk and tl are obtained from the following equations:

$$tk=(|h(V0)|)/(|h(V1)-h(V0)|)$$

$$tl=(|h(V2)|)/(|h(V3)-h(V2)|)$$

These interior division ratios tk and tl are then used to obtain the interior division points Vk and Vl from the following equations:

$$Vk=V0+tk(V1-V0)$$

$$Vl=V2+tl(V3-V2)$$

The above interior-division-point calculations were described with reference to an example of calculating the interior division points for vertex coordinates, but interfor division points for vertex texture coordinates or vertex brightness information could also be obtained by clipping with this embodiment. Concerning the number of vertices of the polygons, the above description used an example of polygons with four vertices, but this embodiment is not limited thereto and it can be applied to clipping processing for polygons having any number n of vertices. In such a case, the above equations can thus be expressed by the following general equation to obtain output data Wout:

$$Wout=Wa+ti(Wb-Wa)$$

W: Clipping for any one of vertex brightness coordinates I0 to In; vertex texture coordinates TX0, TY0 to TXn, TYn; or vertex coordinates X0, Y0, Z0 to Xn, Yn, Zn a, b: Point numbers between two points that are to be clipped ti: The interior division ratio at that point B. Configuration and Operation of Clipping Processing Device The above described inside/outside decisions and interior-division-point calculations of the clipping processing device 420 of this embodiment could be performed by the pipeline processing device shown in FIG. 1, to implement an increase in the speed of processing. A block diagram of an example of the clipping processing device 420 to which the pipeline processing device of this invention is applied is shown in FIG. 15.

Figure 15B:
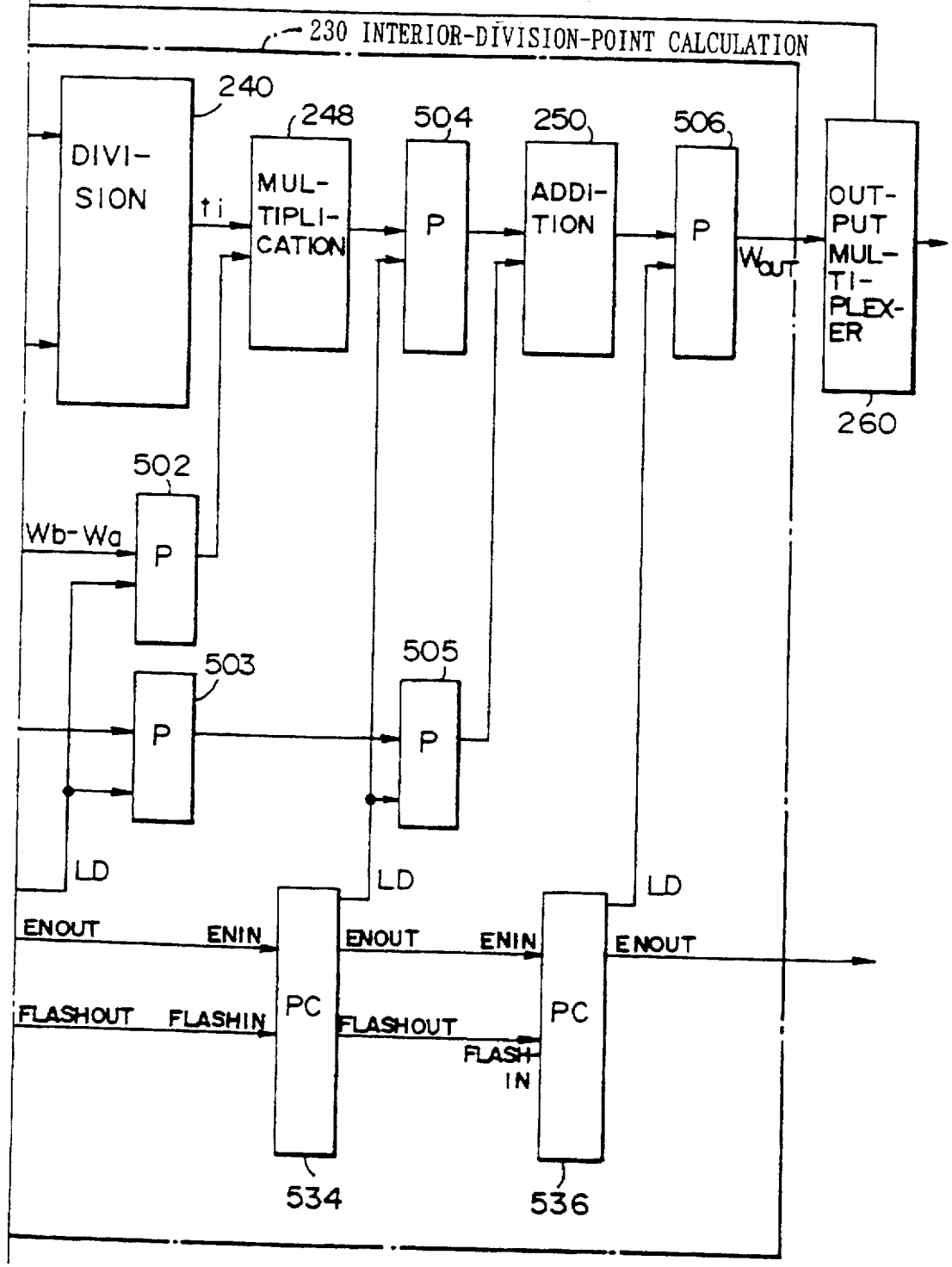

As shown in FIG. 15, the clipping processing device comprises an input section 272, an inside/outside decision section 210 configured of a plane equation calculation section 216 and a clipping specification section 218, a polygon data register 274, an output control section 220 for controlling the pipeline processing device, an interior-division-point calculation section 230 that actually calculates the interior division points, and an output multiplexer 260 for feeding the output data back to the input section 212.

Data such as frame data, object data, polygon data (data has been converted into the viewpoint coordinate system), and data for controlling the pipeline processing device is sequentially input to the input section 212. From this data, the data necessary for the clipping processing device is extracted and subjected to various forms of data format conversion.

For example, details of the monitor that is to display the image, such as its angle and size, are extracted from the frame data, leading to the extraction of coefficients of the plane equations for performing the clipping. Data necessary for the processing of each object is also extracted from the object data. Further data, such as the vertex coordinates, vertex texture coordinates, and vertex brightness information of the polygons, is extracted from the polygon data, this is subjected to the necessary data format conversion, then the vertex coordinates are output to the plane equation calculation section 216 and the data such as the vertex coordinates, vertex texture coordinates, and vertex brightness information is output to the polygon data register 214.

The data input from the input section 212, such as the vertex coordinates, vertex texture coordinates, and vertex brightness information, is sequentially stored in the polygon data register 214, then data (Wa, Wb) is output to the interior-division-point calculation section 230 in accordance with specifications from the clipping specification section 218.

An inside/outside decision is performed by the plane equation calculation section 216 for each of the vertex coordinates Vn of the polygons in accordance with the equation given below, as described above with respect to the calculation method. In this case, the coefficients a, b, c, and d are set by the frame data.

$$h(Vn)=aXn+bYn+cZn+d$$

According to the above calculations, Vn is determined to be in the display region if h(Vn) is less than or equal to zero, or Vn is determined to be in the out-of-display region if h(Vn) is greater than zero.

The results of the decisions obtained by the above described plane equation calculation section 216 are first stored as index data for each polygon vertex by the clipping specification section 218. For example, when it has been determined whether the polygon 70 shown in FIG. 14 are divided between V0 and V1, and between V2 and V3, index data (0, 1) and (2, 3) is stored. The clipping specification section 218 specifies to the polygon data register 214 the output of vertex coordinates, vertex texture coordinates, and vertex brightness information of the polygon corresponding to this index data. In a similar manner, the clipping specification section 218 also specifies to the output control section 220 control over the interior-division-point calculation corresponding to this index data. In this case, h(Vm) and h(Vn) (hereinafter called hm and hn) that are calculated by the plane equation calculation section 216 are output to the interior-division-point calculation section 230 by the clipping specification section 218.

If it is determined that all the vertices of a polygon are outside the display region, that polygon becomes a clipped-out polygon. In such a case, a specification that the image configuration data corresponding to that polygon is to be completely invalidated is therefore output to the polygon data register 214 and the output control section 220. Conversely, if all the vertices of a polygon are determined to be with the display region, interior-division-point calculation is not necessary. In that case, a specification that interior-division-point calculation is not to be performed on that polygon is output to the polygon data register 214 and the output control section 220.

The output control section 220 controls the pipeline register sections 500 to 506 (represented by "P" in FIG. 15) and the pipeline control sections 530 to 536 (represented by "PC" in FIG. 15) in accordance with specifications from the clipping specification section 218. This control is provided by the ENIN and FLASHIN signals.

The interior-division-point calculation section 230 comprises absolute-value calculation sections 232 and 234, a division section 240, a subtraction section 242, a multiplication section 248, an addition section 250, the pipeline register sections 500 to 506, and the pipeline control sections 530 to 536.

The configurations of the pipeline register sections 500 to 506 and the pipeline control sections 530 to 536 are the same as those described above. Note that the BCLK, *CLEAR, and RST signals are omitted from FIG. 15, The values of both |hm−hn| and |hm| are calculated by the absolute-value calculation sections 232 and 234 from hm and hn output from the clipping specification section 218, go then these values are output to the division section 240. The interior division ratio ti=|hm|/|hm−hn| is calculated from this data by the division section 240 and it is output to the multiplication section 248.

The value of (Wb−Wa) is calculated from the polygon data Wa and Wb that is input from the polygon data register 214 through the pipeline register sections 500 and 501 and it is output to the multiplication section 248 through the pipeline register section 502. Note that these data items Wa and Wb are not just polygon vertex coordinates they also include vertex texture coordinates and vertex brightness information. This is because this data will be necessary for the subsequent image processing when the polygon is divided.

The value of ti(Wb−Wa) is then calculated from these values of ti and (Wb−Wa) by the multiplication section 248 and it is output to the addition section 250 through the pipeline register section 504.

The following value is calculated by the addition section 250 from the value of ti(wb−Wa) input through the pipeline register section 504 and the value of Wa input through the pipeline register sections 501, 503, and 505:

$$Wout = Wa + ti(Wb - Wa)$$

Thus the interior division points are obtained.

The calculation result Wout obtained by the interior-division-point calculation section 230 is input to the output multiplexer 260 through the pipeline control section 506.

Usually, when clipping processing is performed, this clipping processing must be performed by a plurality of clipping surfaces 1 to 6 for one polygon, as shown in FIG. 11. This embodiment is formed in such a manner that this clipping processing by a plurality of clipping surfaces is performed by one or a plurality of clipping processing devices, by performing an internal loop operation. The output multiplexer 260 is provided for setting the internal loop for this processing. Connections when an internal loop of this type is formed are shown in FIG. 16A to FIG. 16C.

Figure 16A:
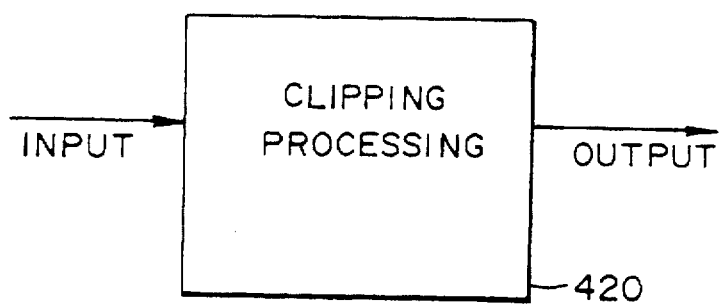
FIGS. 16A, 16B, and 16C are schematic illustrative diagrams of the clipping processing device used in self-loop mode.
Figure 16B:
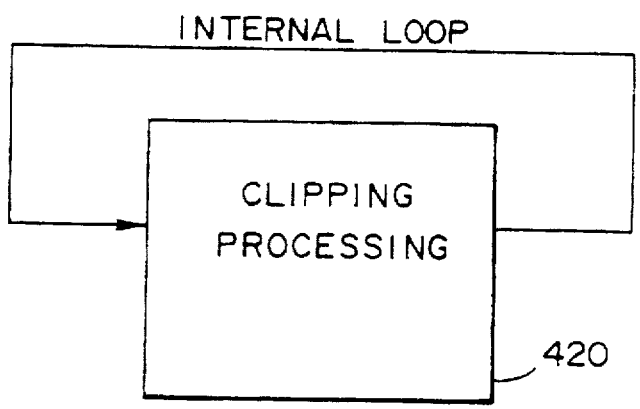

First of all, as shown in FIG. 16A, new data is input after data that has been subjected to processing has been output, and the clipping processing by first clipping surfaces is performed. Subsequently, as shown in FIG. 16B, an internal loop connecting the input and output of the output multiplexer 260 is formed. This returns data that has been subjected to clipping processing by the first clipping surfaces, to the input, then clipping processing by next clipping surface is performed on this returned data.

After clipping processing has been performed in this manner in accordance with a previously determined sequence of clipping surfaces in sequence, the internal loop is removed and data is output to the next stage.

Figure 16C:
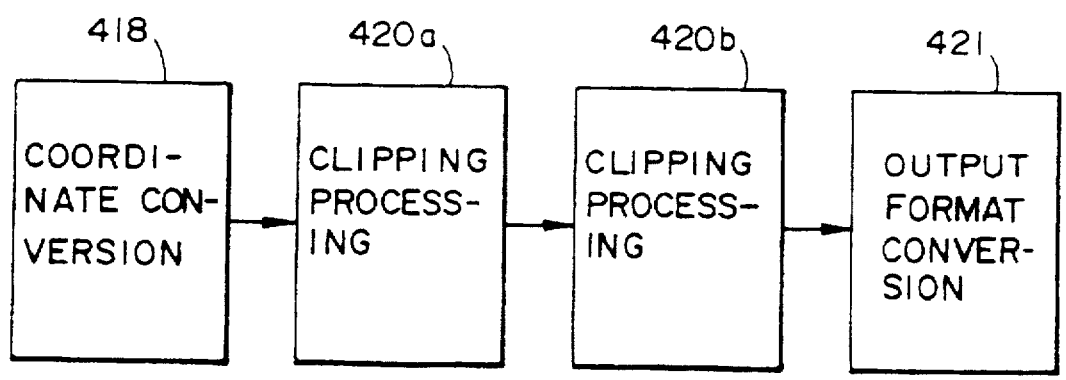

An example of the above described processing in which a plurality of stages of this clipping processing device are provided is shown in FIG. 16C. For example, clipping processing by a first three clipping surfaces is performed by a first-stage clipping processing device 420a, and clipping processing by the remaining three surfaces is performed by a second-stage clipping processing device 420b. Note that a coordinate conversion section 418 in this figure is a block that converts the coordinates of each polygon into the viewpoint coordinate system and an output format conversion section 421 is a block that converts the format of each polygon that has been deformed into a polygonal shape by the clipping processing into a four-sided polygon, for example.

With this embodiment, the clipping processing of the clipping processing device is performed by pipeline processing using the pipeline register sections 500 to 506 and the pipeline control sections 530 to 536. An example of the distinctive operation of this embodiment is described below.

First of all, data in the format shown in FIG. 13 is input to the input section 212. This input data could be data coming from a stage previous to the clipping processing device, or it could be a self-loop data through the output multiplexer 260.

After the thus-input data has been subjected to predetermined format conversion in the input section 272, it is output to other blocks such as the inside/outside decision section 210 and the polygon data register 214. For example, the vertex coordinates (X0 to Z3) shown in FIG. 13, which are to be subjected to inside/outside decision calculation are output to the inside/outside decision section 210. Similarly, data such as the vertex brightness information (I0 to I3), vertex texture coordinates (TX0 to TY3), and vertex coordinates (X0 to Z3) is output to the polygon data register 214.

An inside/outside decision is performed for this polygon by the plane equation calculation section 216 within the inside/outside decision section 210, using the thus-input vertex coordinates (X0 to Z3). If the result of the inside/outside decision is such that clipping occurs between vertices V0 and V1, and between V2 and V3, for example, the (0, 1) and (2, 3) index data is stored in the clipping specification section 218.

When the inside/outside decision of the inside/outside decision section 210 ends, vertex brightness information, vertex texture information, and vertex coordinates are output by the polygon data register 214 in a predetermined format based on the above described index data. In this case, data in the format of (Wa, Wb)=(I0, I1), (I1, −), (I2, −), (I2, I3), (TX0, TX1), (TY0, TY1), (TX1, −), (TY1, −), (TX2, −), (TY2, −), (TX2, TX3), (TY2, TY3), (X0, X1), (Y0, Y1), (Z0, Z1), (X1, −), (Y1, −), (Z1, −), (X2, −), (Y2, −), (Z2, −), (X2, X3), (Y2, Y3), and (Z2, Z3), for example, is sequentially output to the pipeline register sections 500 and 501. Note that "−" in this data means "don't care." The pipeline register sections in this case are driven by the ENIN signal. The output of hm and hn to the absolute-value calculation sections 232 and 234 by the clipping specification section 218 is arranged to occur at the point at which the data processing by the division section 240 with respect to the previous polygon data has ended.

Figure 17A:
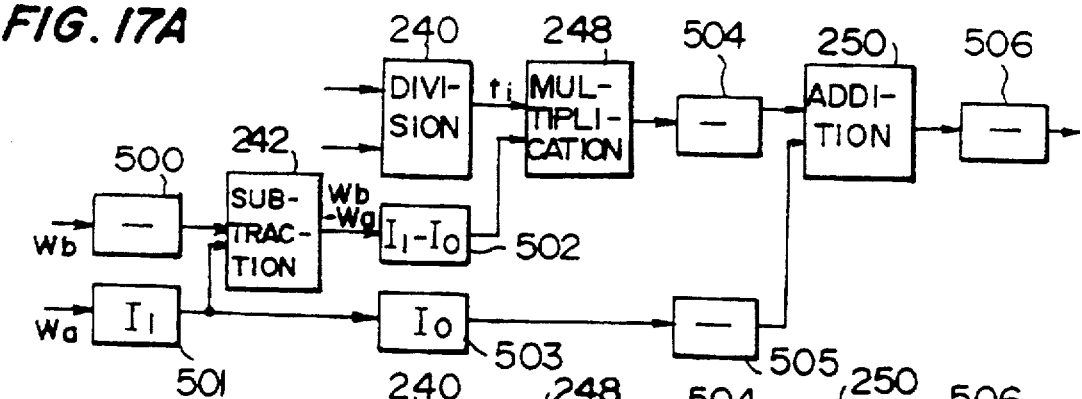
FIGS. 17A, 17B, 17C, and 17D are schematic diagrams for illustrating the operation of the clipping processing device.

With the embodiment shown in FIG. 15, the data processing performed by the division section 240 takes the most time-it could take 12 clocks, for example. Otherwise, the absolute-value calculation sections 232 and 234, the subtraction section 242, the multiplication section 248, the addition section 250 take only one clock each for data processing. Therefore, at the point at which the data output from the polygon data register 214 has been transferred to the pipeline register sections 502 and 503, it goes into a halted state waiting for the result of the calculation by the division section 240, as shown in FIG. 17A. In other words, at the state in which (I0, I1−I0) has been stored in the pipeline register sections 503 and 502, ENIN is negated and pipeline processing halts. After a given time has expired, the ENIN signal is asserted and pipeline processing restarts when the calculation result is output from the division section 240, causing the state shown in FIG. 17B.

In this example, since there is no interior division point between the vertices V1 and V2, it is necessary to output I1, without performing any interior-division-point calculation. Therefore, in this case, ti, which is the output of the division section 240 is set to zero. Since division by the division section 240 is not necessary, the contents of the pipeline register sections 500 to 506 shift in synchronization with the clock signal BCLK. This is the state shown in FIG. 17C.

Figure 17B:
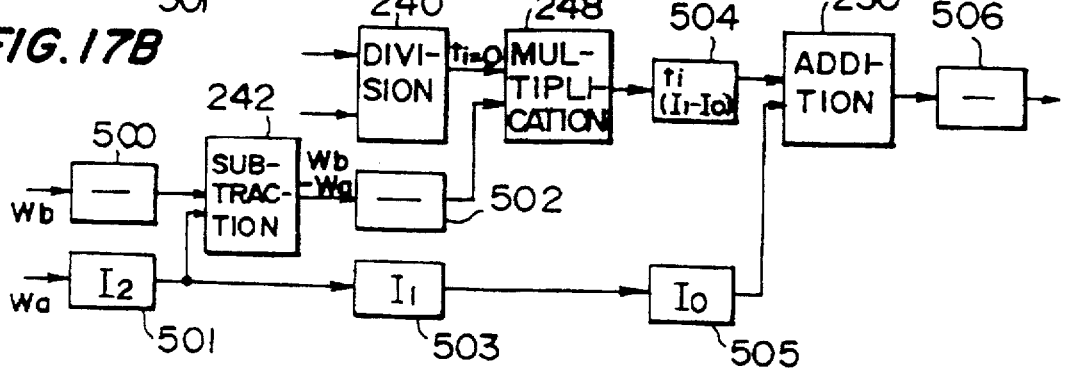
Figure 17C:
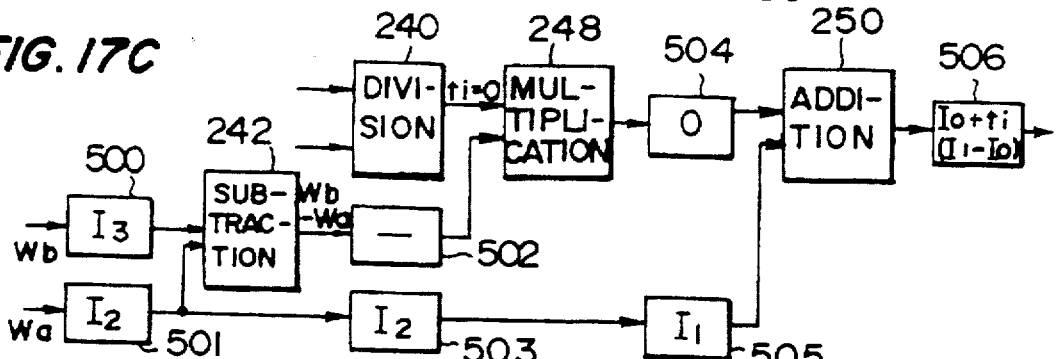

In FIG. 17C, since ti has been set to zero by the state shown in FIG. 17B, zero is input to the pipeline register section 504. The interior-division-point IK=I0+ti(I1−I0) of the vertices V0 and V1, which is the final calculation result is input to the pipeline register section 506. Data (I2, −) is input to the pipeline register sections 503 and 502. Since it is also necessary to output I2, without performing any interior-division-point calculation, ti is set to zero. In this state, the contents of the pipeline register sections 500 to 506 are shifted to produce the state shown in FIG. 17D.

Figure 17D:
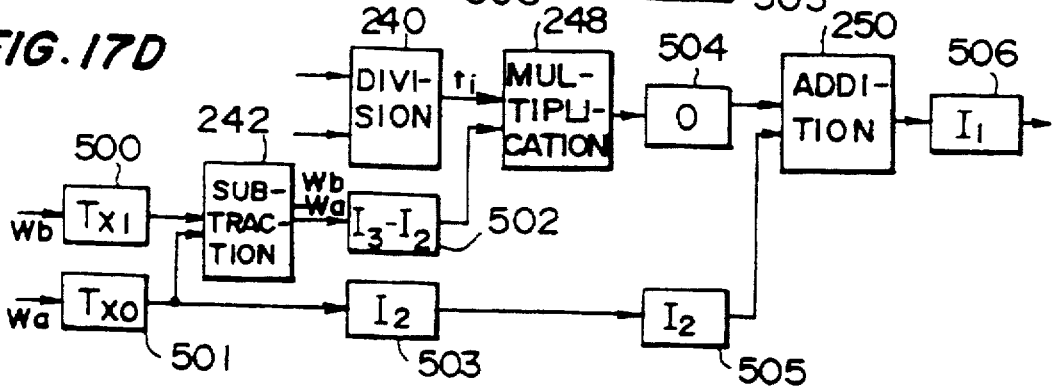

As shown in FIG. 17D, I1 is output to the pipeline register section 50 without being subjected to any interior-division-point calculation. Data (I2, I3−I2) for obtaining the interior division point between the vertices V2 and V3 is input to the pipeline register sections 503 and 502. By this sequential progress of the pipeline processing, the vertex brightness information (I0, I1, I2, I3) for the polygon is converted into (IK, I1, I2, IL). In a similar manner, interfor-division-point calculation is performed for the vertex texture coordinates (TX0 to TY3) and vertex coordinates (X0 to Z3), to provide new polygon data after the clipping processing.

Figure 18A:
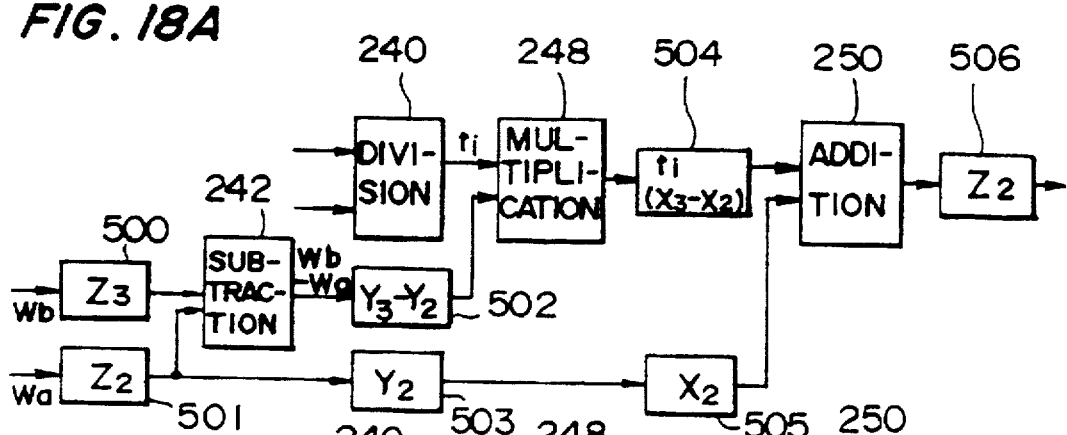
FIGS. 18A and 18B are schematic diagrams for illustrating the operation of the clipping processing device.
Figure 18B:
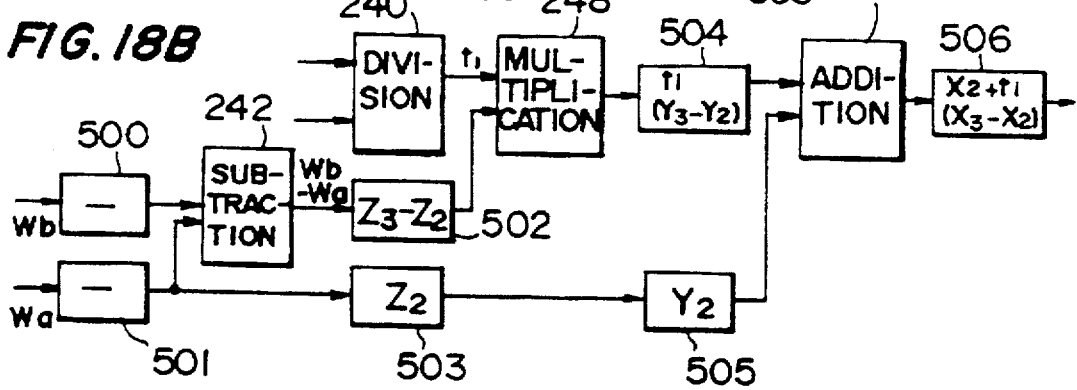
Figure 19A:
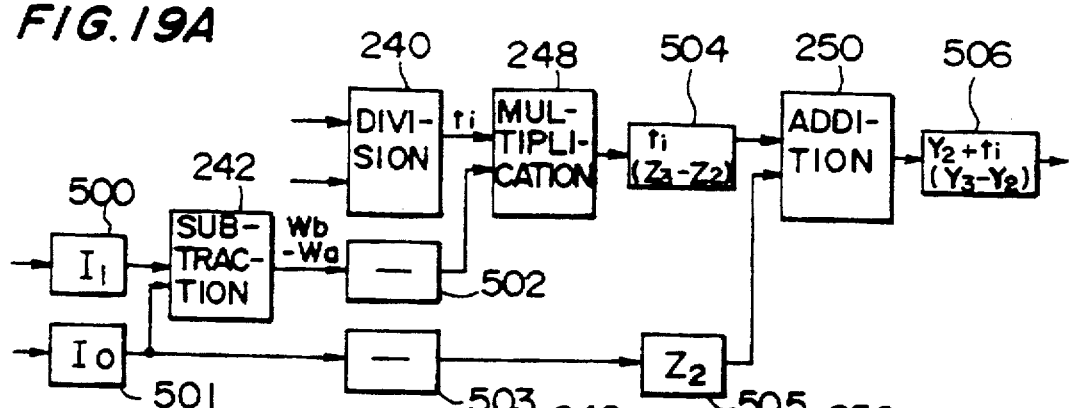
FIGS. 19A, 19B and 19C are schematic diagrams for illustrating the operation of the clipping processing device.
Figure 19B:
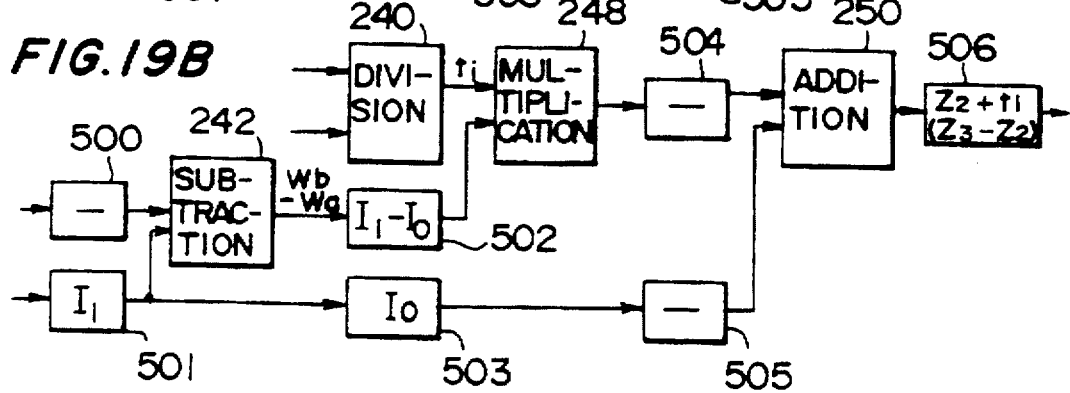

A state in which the final data (Z2, Z3) of this polygon is output from the polygon data register 214 is shown in FIG. 18A. At the end point of the input of data in which a plurality of data items is formed into one string, the output control section 220 asserts the FLASHIN signal. Then, the data in which a plurality of data items is formed into one string is automatically driven to be extracted, regardless of the pipeline drive in accordance with the ENIN signal. In other words, as shown in FIG. 18B, regardless of the fact that the data to be processed next has not yet been input to the pipeline register sections 500 and 501, data driven by this FLASHIN signal is automatically shifted to the next pipeline register section. Brightness information (I0, I1) for the polygon that is to be processed next is input to the pipeline register sections 501 and 500, as shown in FIG. 19A, and a state occurs in which the division result ti from the section 240 is output, as shown in FIG. 19B. In this case too, data relating to the previous polygon is automatically extracted, regardless of the output of the division result, as shown in FIG. 19B and FIG. 19C.

Figure 19C:
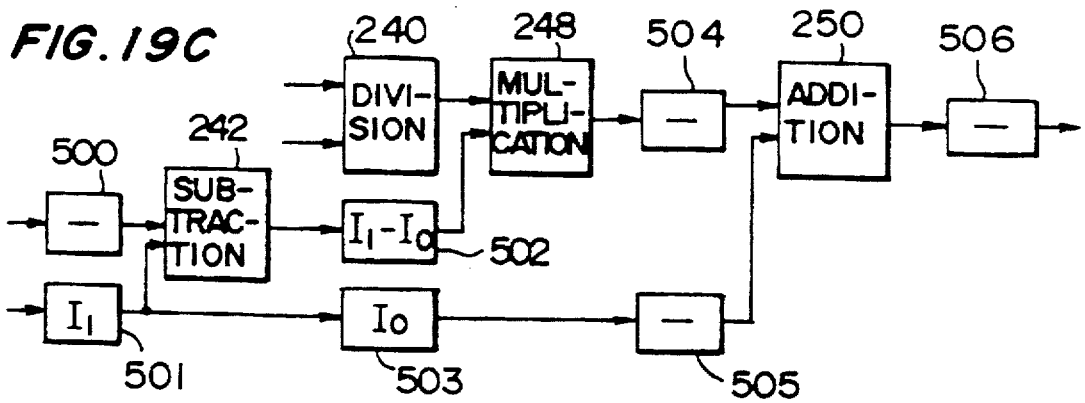
Figures 20A, 20B:
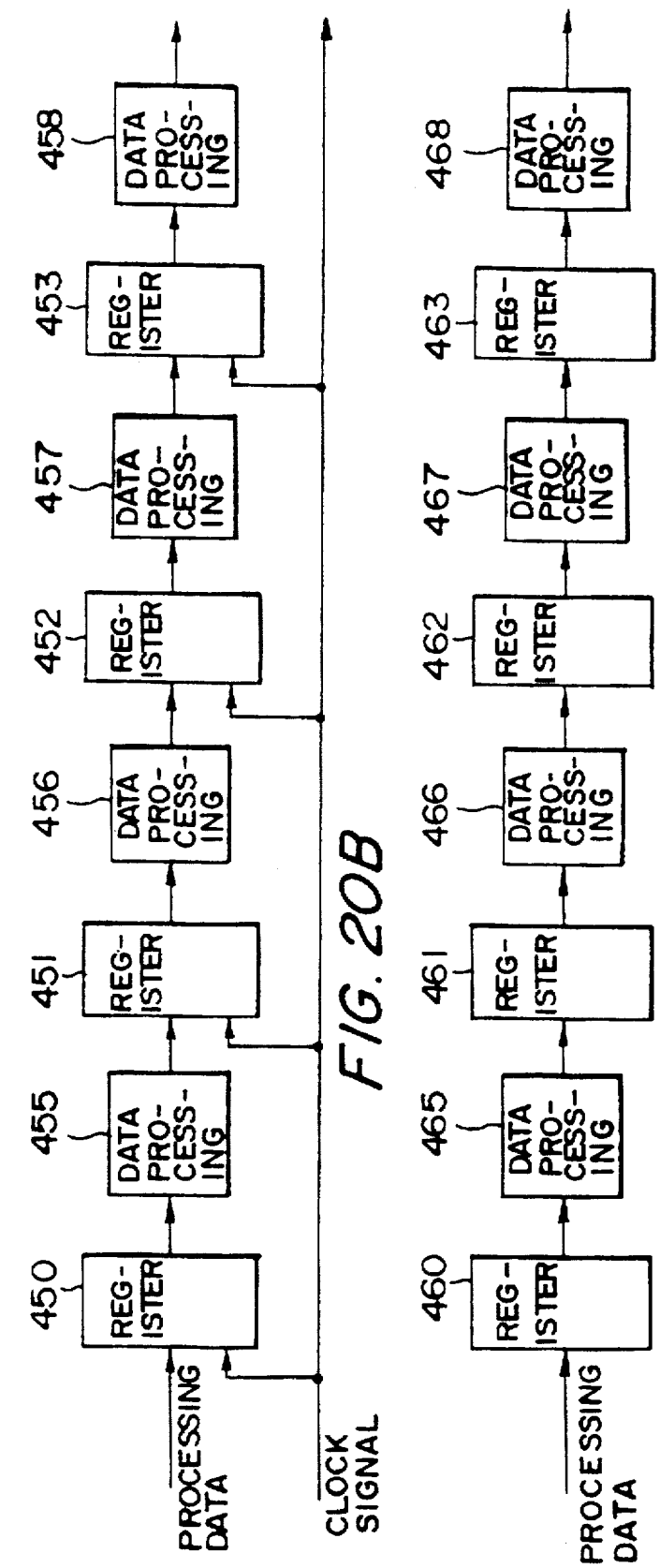
FIGS. 20A and 20B are schematic block diagrams of a prior-art clock-driven pipeline processing device and data-driven pipeline processing device, respectively.

With this embodiment as described above, there absolutely no necessity for controlling data once it has been driven by the FLASHIN signal, making the control method extremely simple and enabling the implementation of a shortening of the design period, as shown in FIG. 19B and FIG. 19C. As a result, data for which calculation processing has ended can be used immediately in the next calculation processing.

This embodiment forms a self-loop as shown in FIG. 15 and FIG. 16, to return data for which calculation processing has ended to the input section 212 via the output multiplexer 260. The configuration is such that an inside/outside decision is performed for the next surface by the inside/outside decision section 210, using this returned data, and clipping processing is performed for the next surface. Thus, it is necessary to return data for which the calculations by the interior-division-point calculation section have ended to the inside/outside decision section 210 through the output multiplexer 260, as quickly as possible. However, in the pipeline processing device according to the prior-art data drive method, the next data is in a state in which it is waiting for the division result from the pipeline register sections 502 and 503, as shown in FIGS. 19B and 19C, so that the data in the pipeline register sections 504, 505, and 506 cannot proceed further. This state means that efficient pipeline processing cannot be performed by the prior-art pipeline processing device, which makes it extremely inappropriate as a 3D simulator device that necessitates real-time pipeline processing.

In this case, special methods have been considered for avoiding this state, such as inputting dummy data to the pipeline register sections to push out the previous data. However, the timing of pipeline processing within this clipping processing device changes in a complicated manner, owing to various factors such as the player's control state and the game state; In other words, a state could occur in which interior-division-point calculation must be performed for virtually all of the polygons, depending on the player's control. Conversely, if the game state specifies that the polygons are concentrated in the central section of the display screen, a state will occur in which there is no need for interior-division-point calculation for virtually all of the polygons. Another state could occur in which the processing of a processing section that is a previous stage of the pipeline processing device is delayed, in which case it will be unable to output data to this pipeline processing device. Therefore, if the above states cause such complicated changes in the timing of the clipping processing, it would not be easy to use one of the above described special methods to avoid a loss of efficiency of the pipeline processing.

In contrast thereto, this embodiment makes it possible to perform efficient pipeline processing by an extremely simple control method that drives the data in a pipeline by the ENIN signal then simply asserts the FLASHIN signal after the end of data input, even if the above described various different states cause the timing of the clipping processing to change in a complicated manner. Moreover, the configuration of the pipeline control sections 530 to 536, each connected to one of the pipeline register sections 500 to 506, is extremely simple, so that the number of circuits is very small. Therefore, the pipeline processing device of this embodiment is provided with both the advantages of a data-driven pipeline processing device that implements efficient pipeline processing and a clock-driven pipeline processing device that has a simple control method, so that it is the optimal pipeline processing device in a 3D simulator device where real-time pipeline processing is necessary.

Note that the present invention is not limited to the above described embodiments; it can be embodied in many different ways within the scope of the invention.

For example, the calculation processing of data to which this invention is applied is not limited to the above described clipping processing and it could be applied to various other types of pipeline processing in which real-time calculation processing is necessary.

The input location of the input flash signal of this invention is not limited to the first stage; it could be input to the second or third stage, for example.

The calculation method used in this invention for the clipping processing performed by the clipping calculation means is not limited to the above described calculation method; calculation methods using various different types of algorithm could be used instead.

The 3D simulator device of this invention can be applied to various different purposes, such as an arcade games machine, a family computer (domestic) games machine, a flight simulator, or a driving simulator as used in a driving school. It can also be applied to a large-scale attraction type of game device or simulator in which a number of players participate.

The calculation processing performed by components such as the virtual 3D space calculation means, image synthesis means, and clipping processing device that have been described above with respect to this embodiment could be performed by a dedicated (custom made) image processing device, or it could be performed by software means such as in a general-purpose (standard type) microprocessor or DSP.

Furthermore, the calculation processing performed by the virtual 3D space calculation means and image synthesis means is not limited to the calculations described with respect to this embodiment.

The 3D simulator device to which this invention is applied includes a configuration in which the image is displayed on a display means known as a head-mounted display (HMD).

What is claimed is:

1. A pipeline processing device for transferring processing data by pipeline processing, comprising:

a plurality of serially connected pipeline registers for sequentially transfer which processing data in which a plurality of data items are formed into one string; and pipeline control means, to which a pipeline drive signal and a flash signal are input, for controlling data transfer in said plurality of pipeline registers on the basis of said pipeline drive signal and said flash signal, said pipeline control means comprising:

means for permitting data transfer to one pipeline register among said plurality of serially connected pipeline registers from a previous serially connected pipeline register only when processing data is present in the serially connected pipeline register and said pipeline drive signal has been enabled; and means for automatically extracting from said plurality of serially connected pipeline registers one string of processing data that has already been input when said flash signal has been enabled, independently of said pipeline drive signal being enabled or disabled.

2. A pipeline processing device for transferring processing data by pipeline processing, comprising:

a plurality of serially connected pipeline registers using a transfer clock to sequentially transfer processing data in which a plurality of data items are formed into one string; and a plurality of pipeline control means, each connected to one of said plurality of serially connected pipeline registers, for generating and outputting a signal that enables data transfer to a pipeline register from a previous serially connected pipeline register using said transfer clock;

wherein each of said pipeline control means comprises:
pipeline drive permitting means for:
generating a signal that transfers data to that pipeline register connected to the pipeline control means from a previous serially connected pipeline register connected to a pipeline control means when one of an input pipeline drive signal and an input flash signal input to the pipeline control means connected to said pipeline register from the pipeline control means connected to the previous serially connected pipeline register is enabled, and also holding said input pipeline drive signal in a first memory means of the pipeline control means connected to said pipeline register, and enabling an output pipeline drive signal to be output from the pipeline control means connected to said pipeline register to a pipeline control means connected to a subsequent serially connected pipeline register when both 1) an input pipeline drive signal held in said first memory means, and 2) said input pipeline drive signal input to the pipeline control means connected to said pipeline register from the pipeline control means connected to the previous serially connected pipeline register, are enabled; and flash permitting means for:
holding the input flash signal input to the pipeline control means connected to said pipeline register from the pipeline control means connected to the previous serially connected pipeline register in a second memory means of the pipeline control means connected to said pipeline register, and enabling an output flash signal output from the pipeline control means connected to said pipeline register to the pipeline control means connected to the subsequent serially connected pipeline register when either an input flash signal held in said second memory means one transfer clock period previously or said input flash signal inputted to the pipeline control means connected to said pipeline register from the pipeline control means connected to the previous serially connected pipeline register is enabled.

3. The pipeline processing device as defined in claim 2, wherein said pipeline drive permitting means comprises means for clearing data held in said first memory means and said data clearing means initializes said pipeline processing device by clearing said data held in said first memory means.

4. A clipping processing device for performing clipping processing using a plurality of clipping surfaces with respect to a three-dimensional object represented by a plurality of polygons, comprising:

inside/outside decision means for determining whether a polygon is divided by a clipping surface on the basis of input polygon image data;

interior-division-point calculation means for using said input polygon image data to calculate interior division points for said polygon when said inside/outside decision means determines said polygon is divided; and output control means for generating a pipeline drive signal and a flash signal and outputting said pipeline drive and flash signals to said interior-division-point calculation means;

wherein said interior-division-point calculation means comprises:

a plurality of serially connected pipeline registers for sequentially transferring polygon image data in which a plurality of data items are formed into one string; and pipeline control means, to which said pipeline drive signal and said flash signal are input from said output control means, for controlling data transfer in said pipeline registers on the basis of said pipeline drive signal and said flash signal, said pipeline control means comprising:

means for permitting data transfer to one pipeline register among said plurality of pipeline registers from a previous serially connected pipeline register only when polygon image data is present in the previous serially connected pipeline register and said pipeline drive signal has been enabled; and means for automatically extracting from said plurality of pipeline registers one string of polygon image data that has already been input when said flash signal has been enabled, independently of said pipeline drive signal being enabled or disabled.

5. The clipping processing device as defined in claim 4, wherein:

said interior-division-point calculation means comprises a division means for performing a division that divides a distance between vertex coordinates of a polygon; and said output control means comprises means for detecting completion of a division performed by said division means and means for enabling said pipeline drive signal when division completion has been detected by said detection means.

6. The clipping processing device as defined in claim 4, further comprising:

means for re-inputting polygon image data for which clipping processing using one clipping surface has ended to said inside/outside decision means and said interior-division-point calculation means, and thus subjecting said polygon image data to clipping processing using another clipping surface.

7. A three-dimensional simulator device comprising a clipping processing device as defined in claim 4, further comprising:

image synthesis means for synthesizing a field-of-view image as seen from an observer within a virtual three-dimensional space, using a polygon that has been subjected to clipping processing by said clipping processing device.

8. A pipeline processing method comprising:

using a pipeline drive signal and a flash signal to control data transfer between a plurality of serially connected pipeline registers, wherein a plurality of data items are formed into one string; which is input into the plurality of serially connected pipeline registers;

permitting data transfer to a pipeline register from a previous serially connected pipeline register only when processing data exists in the previous serially connected pipeline register and said pipeline drive signal has been enabled; and automatically extracting one string of processing data that has already been input when said flash signal is enabled, independently of said pipeline drive signal being enabled or disabled.

* * * * *